Aug. 25, 1959    M. L. HUTCHENS ET AL    2,900,849
INDEXING MECHANISM FOR A MACHINE TOOL
Filed July 20, 1954    7 Sheets-Sheet 1

INVENTORS
Morris L. Hutchens, Joseph J. Lenert,
Howard F. Henderson.
BY
ATTORNEY INVENTORS
Morris L. Hutchens, Joseph J. Lenert,
Howard F. Henderson.
BY
Elroy J Wutschel
ATTORNEY Aug. 25, 1959     M. L. HUTCHENS ET AL     2,900,849
INDEXING MECHANISM FOR A MACHINE TOOL
Filed July 20, 1954                                     7 Sheets-Sheet 5
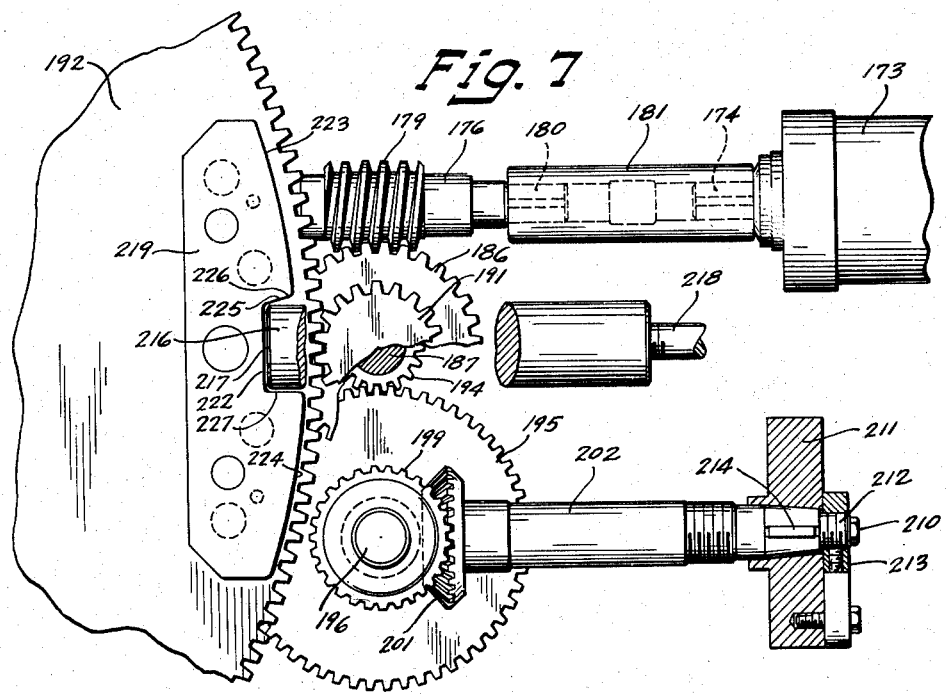
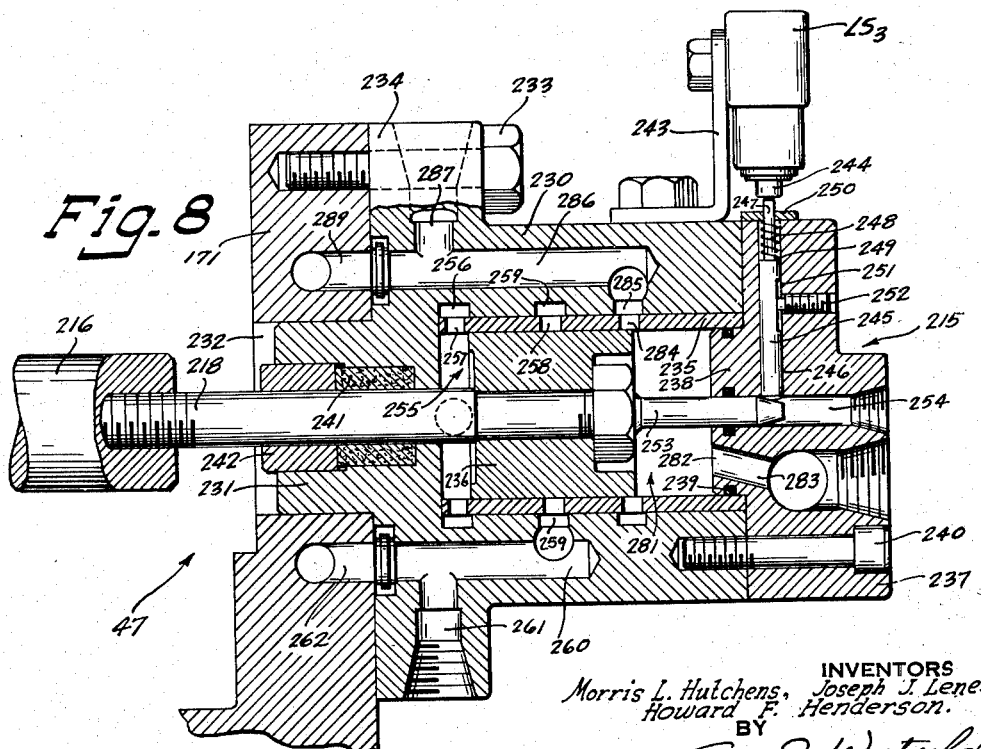
INVENTORS
Morris L. Hutchens, Joseph J. Lenert,
Howard F. Henderson.
BY
ATTORNEY

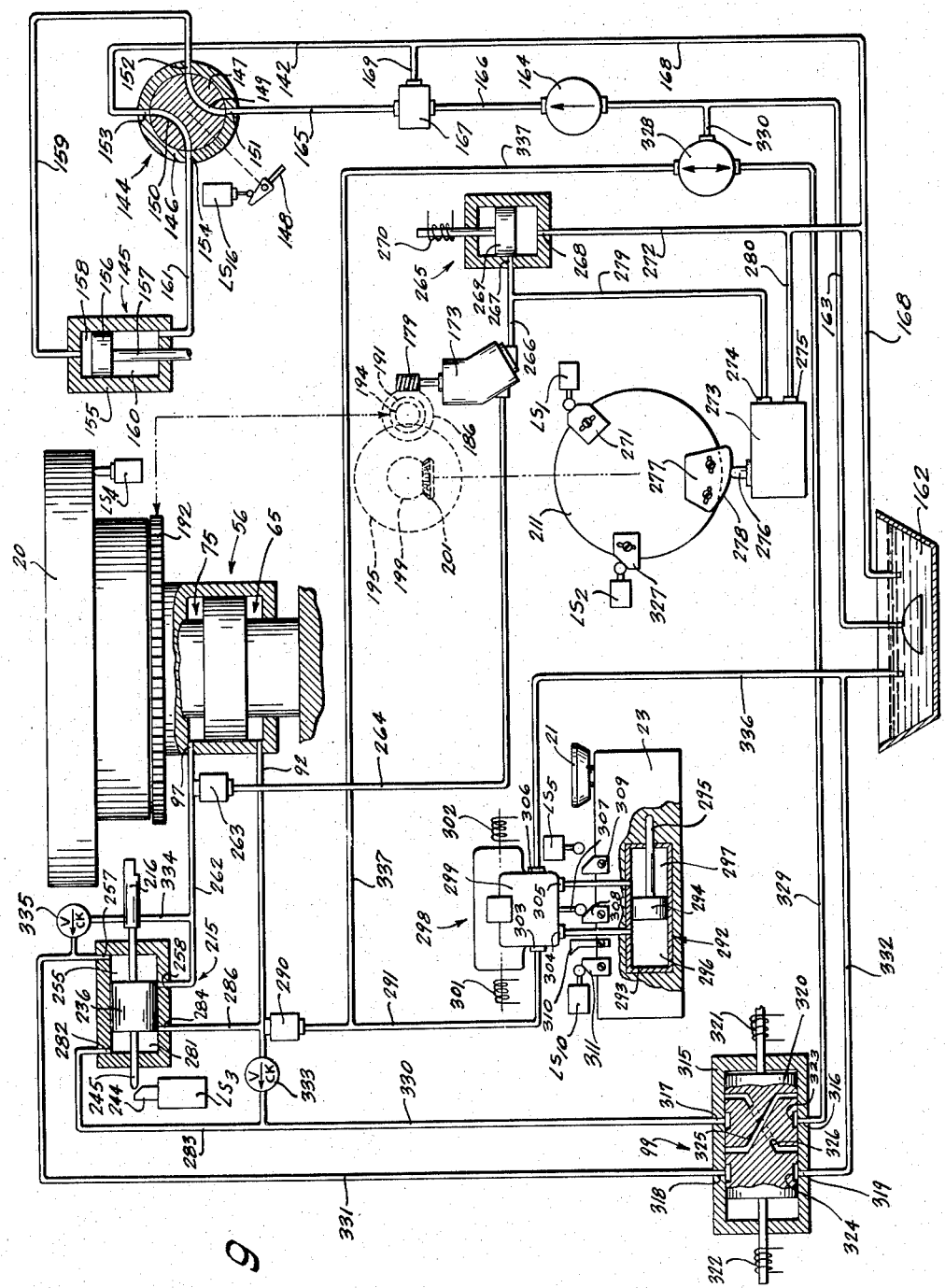

INVENTORS
Morris L. Hutchens, Joseph J. Lenert,
Howard F. Henderson.
BY
ATTORNEY United States Patent Office 2,900,849
Patented Aug. 25, 1959

2,900,849

INDEXING MECHANISM FOR A
MACHINE TOOL

Morris L. Hutchens, Brookfield, Joseph J. Lenert, Milwaukee, and Howard F. Henderson, West Allis, Wis., assignors to Kearney & Trecker Corporation, West Allis, Wis., a corporation of Wisconsin Application July 20, 1954, Serial No. 444,438

18 Claims. (Cl. 74—826)

This invention relates generally to machine tools and more particularly to an automatic machine adapted to effect indexing of a work supporting table to a plurality of stations successively and when indexed to clamp the table in the indexed position.

A general object of the invention is to provide an improved unitary indexing and control mechanism for a work supporting table which is particularly adaptable for use with a multiple tool machine.

Another object of the invention is to provide an improved means for raising the work supporting table from its supporting base prior to an indexing movement of the table.

Still another object of the invention is to provide an improved locating mechanism for precisely locating a work supporting table in an indexed position, upon the completion of an indexing movement.

Yet another object of the invention is to provide a fluid pressure actuated clamping mechanism to rigidly clamp a work supporting table to its supporting base in a precise predetermined position and which is operative upon the table being precisely located.

Still another object of the invention is to provide cyclic control means to initiate the actions of the various mechanisms in a predetermined sequence to effect automatic indexing of the work supporting table.

According to this invention there is provided a self-contained indexing apparatus, for use with a machine tool, which is automatic in operation to rotate a work supporting table step by step to a series of stations consecutively. Upon completion of a rotational movement of the table, a locating mechanism is actuated to precisely locate the table in a predetermined position where it is securely clamped in the precise position. To this end, the work supporting table is rotatably mounted on a base, and has associated with it a reciprocal hydraulic mechanism to raise the table from the base prior to an indexing movement. The table is rotated or indexed by a fluid driving motor operably connected to it and which is adapted to receive fluid pressure to rotate the table after the table has been raised from the supporting base. The fluid discharged by the fluid driving motor is metered to control the rate of rotation and the angular displacement of the table. After the table has been indexed a plunger is actuated to engage the table to precisely locate the table in a predetermined position, whereupon the action of the hydraulic elevating mechanism is reversed to lower the table and clamp it in the precise position. Incorporated in the apparatus is a cyclic control plate having a plurality of dogs secured to it for the purpose of automatically controlling the functioning of the apparatus. To this end, the plate is rotatably mounted on the base and operatively connected to be rotated by the table driving motor through 360° for each indexing movement of the table to effect a complete cycle which is repeated for every indexing movement of the table. The dogs secured to the plate will actuate the metering means and various microswitches which in turn energize solenoids to actuate valves to control the admission of fluid pressure to the actuator of the plunger mechanism and also to direct the flow of fluid discharge from the driving motor to the metering means or to by-pass the metering means and return the fluid to a reservoir directly.

The foregoing objects of the invention, and others which will become apparent from the following detailed description, may be achieved by means of the exemplifying apparatus depicted in and set forth in this specification in connection with the accompanying drawings, in which:

Fig. 7 is an enlarged schematic plan view of the indexing mechanism showing the driving connection from the motor to the table driving gear and to the cyclic dog plate;

Fig. 8 is an enlarged horizontal longitudinal section of the index plunger mechanism taken generally on a line 8—8 in Fig. 3, showing the index plunger and actuator with hydraulic circuits to the actuator;

Fig. 9 is a diagrammatic view of the hydraulic circuit of the apparatus incorporated with the hydraulic circuit of a work holding fixture and a tool unit of a machine tool; and, Fig. 10 is a wiring diagram of the electrical control circuit of the invention as it is incorporated into the electrical circuit of the machine tool.

Figure 1:
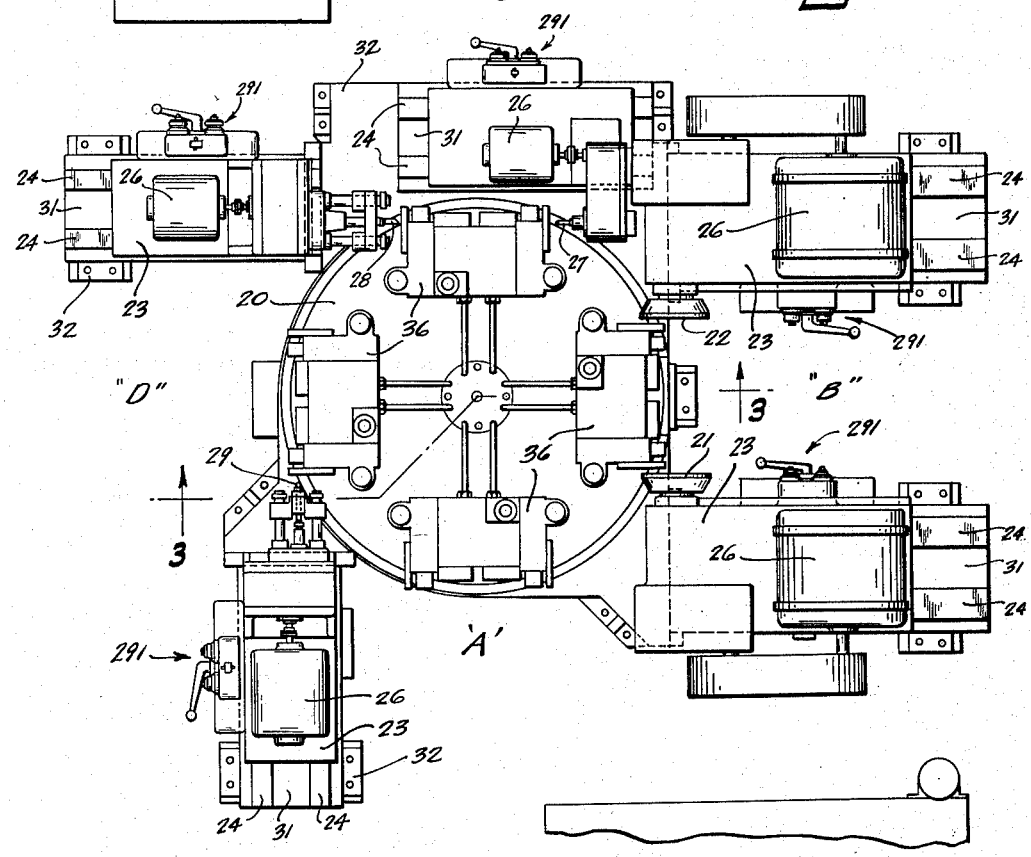
Figure 1 is a plan view of a multiple tool automatic machine in which the invention has been incorporated.
Figure 2:
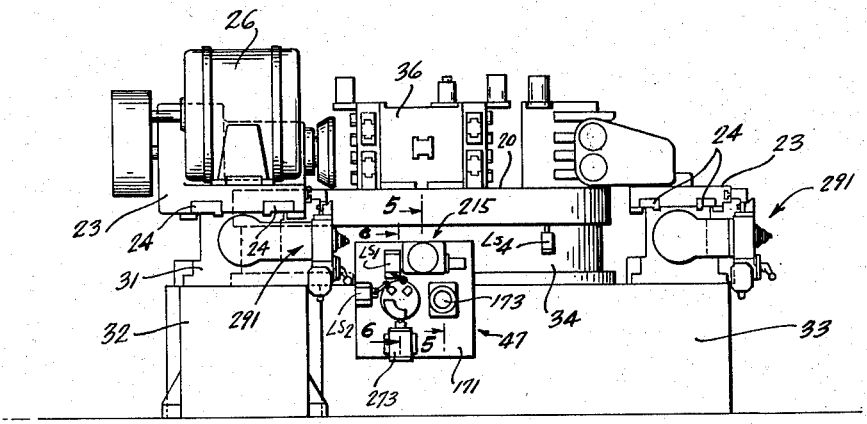
Fig. 2 is a view in right side elevation of the machine shown in Fig. 1, showing the unitary indexing unit in place in the machine with the right hand tool unit being omitted.

It is not believed necessary to describe in detail the structure of the various units surrounding the work table 20. Referring now to Figs. 1 and 2, the table has four stops or stations. Each piece of work, in this instance an automobile cam shaft, makes four stops. The first station, generally denoted at "A," is a loading and unloading station which is disposed toward the front of the machine.

At the next or second station, generally denoted at "B," the workpiece is subjected to face milling of the ends by means of milling cutters 21 and 22, each being moved into engagement with the workpiece by means of a slide 23 slidable on ways 24. Each cutter is driven by a separate driving motor 26.

At the next or third station, generally denoted at "C," the workpiece is center drilled at each end by means of drills 27 and 28 and which are moved into work engaging positions by the same type of slide 23 as are the cutters 21 and 22. The drills 27 and 28 also have separate driving motors 26.

At the next or fourth station, generally denoted at "D," the workpiece has one end again drilled by means of drills 29 which are also moved into engagement with the workpiece by the same type of mechanism as are the other tools and it is also driven by a separate driving motor 26.

All of the tool units are slidably mounted on ways 24 on respective tables 31 mounted on bases 32 of box-like construction attached to a bed 33 in spaced relationship about its periphery. The bed 33 supports a base 34 upon which is rotatably supported the work table 20. Four work holding fixtures 36 are secured to the top of the table 20 proximate its periphery for the purpose of presenting workpieces to be operated upon by the several tools previously described.

It is to be understood that while the invention is described herein as having four indexing stations, the invention is capable of being adapted to accommodate a greater or lesser number of stations as desired, and the number of stations need not be an even number.

The apparatus is entirely automatic, except for the loading and unloading of the workpiece by the operator, and is controlled throughout and synchronized by electrical means, which will be described later, through the use of limit switches, relays and solenoid operated valves. A completely interlocked electrical control circuit is provided to prevent any possibility of damage due to mechanical or hydraulic malfunction or carelessness on the part of the operator.

Figure 3:
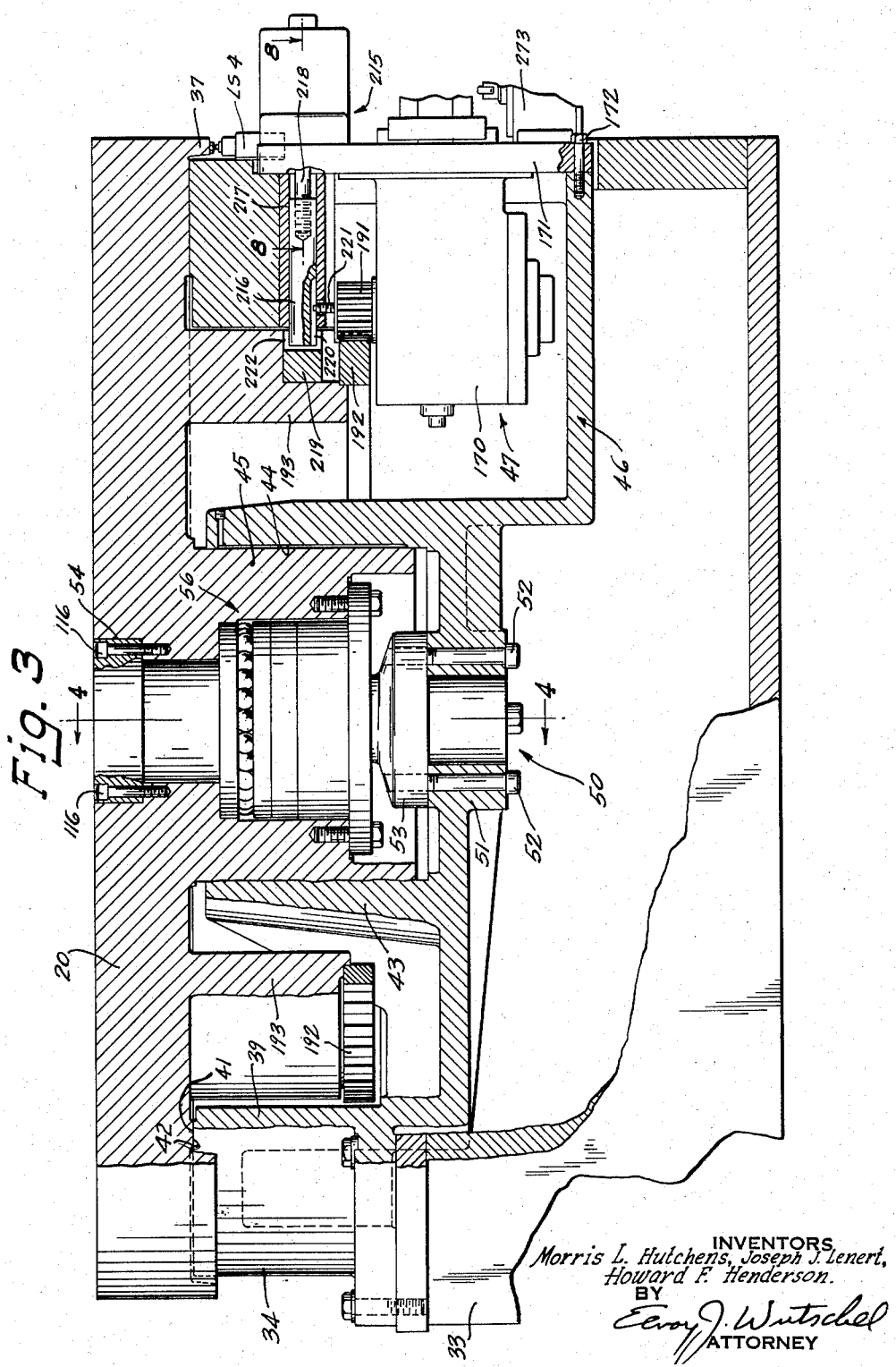
Fig. 3 is a sectional view in elevation of the table, table base and bed of the machine taken generally on the line 3—3 in Fig. 1, showing the table mounted on the base and the driving connection from the indexing mechanism to the table.

The work table 20 is rotatably journalled in and upon a supporting base 34 of circular form corresponding generally to the form of the table and secured to the bed 33. As shown in Fig. 3, the work table includes a circular apron 37 overhanging the periphery of the base 34. The weight of the table 20 is carried by an outer vertical circular flange 39 of the base 34, the outer surface of which constitutes the periphery of the base. The flange 39 has a top bearing surface 41 which is engaged by a bearing surface 42 formed on the bottom surface of the table 20. For centering the table 20 on the base 34, the base is provided with an inner circular flange 43 projecting upward from the bottom of the base to form a bore 44 for receiving a depending circular flange 45 provided on the table 20 and serving as a bearing for guiding the table 20 in its rotational movement. Attention is called to the construction of the flanges 43, 45, and which is clearly shown in Fig. 3, so that when the table 20 is at rest upon the base 34 the top of the upstanding circular flange 43 of the base clears the bottom of the table 20 and the depending circular flange 45 of the table clears the bottom surface of the base 34, so that the entire weight of the table is carried on the bearing surface 41 of the outer base flange 39. The base 34 has integrally formed therein a housing 46 for receiving a compact table indexing mechanism generally indicated by the numeral 47 and which will subsequently be more fully described.

One of the features of the present invention includes a novel arrangement for clamping the table 20 in an indexed position and releasing it for rotational movement by means of hydraulic pressure applied to raise the table off of the bearing surface 41 to render it freely rotatable for effecting an indexing movement. Upon completion of such movement, the pressure is reversed to force the table downwardly into rigid clamping engagement with the bearing surface 41. The mechanism for accomplishing this operation includes an indexing center post generally indicated at 50, shown in Fig. 4. The center post 50 is mounted in a hub 51 formed in the bottom of the base 34 and secured therein by bolts 52, as illustrated in Fig. 3, which extend through the hub 51 and are in threaded engagement with cooperating threaded holes formed in a radial flange portion 53 of the center post 50. The center post 50 extends upwardly into the hollow circular center of the depending flange 45 of the table 20 and has its top portion journalled in a collar 54, to be described later, which is recessed into the top of the table 20.

Journalled on the center post is a cylinder and piston mechanism generally indicated at 56. The mechanism comprises a cylinder 57 rotatably mounted on the center post 50 and provided with an annular groove 58 concentric with it and adjacent to the center post on the inner face of the cylinder head. A piston 59 is journalled on a reduced portion 61 of the center post. A shoulder 62 formed by the reduced portion 61 serves as a stop for spacing the piston a slight distance 63 from the cylinder head and also effectively prevents the piston 59 from moving downwardly. The lower face of the piston 59 is also provided with an annular groove 64, concentric with the piston and adjacent to the center post, which cooperates with the groove 58 to form a chamber 65. The piston 59 is restrained from movement upwardly by a retainer nut 67 threadedly engaged with a mating thread formed on the center post 50.

A bearing retainer 69 is journalled on the center post and formed in a manner so that it forms a cap over the retainer nut 67. The bearing retainer has a portion 71 extending downwardly into the cylinder 57 but which does not contact the piston 59. The bearing retainer 69 is also formed with a radially extending flange section 72 for seating the retainer on the end face of the cylinder 57 and through which cap screws 73, one of which is shown, extend into engagement with threaded holes formed in the end face of the cylinder 57 to secure the bearing retainer 69 to the cylinder 57. The inner surface of the bearing retainer 69 is formed in a manner to provide a chamber 75 above the upper surface of the retainer nut 67. The downwardly extending portion 71 of the bearing retainer 69 is spaced from the retainer nut 67 in a manner to form a communicating passage 76 to a chamber 77 which has been formed by the lower surface of the downwardly extending portion 71 of the bearing retainer 69 and the upper surface of the piston 59.

An antifriction bearing 78 is firmly seated around the bearing retainer 69 in a recess provided in its top and outer surface. The bearing 78 is seated in the recess of the bearing retainer sufficiently far for the upper race 79 to have lateral bearing against the outer periphery of the bearing retainer 69 and still extend above its upper surface. The bearing 78 extends above the bearing retainer 69 so that the table 20 will rest upon the bearing free from contact with the bearing retainer 69. A clamp ring 81 is secured to the depending circular flange 45 of the table 20 by bolts 82, one of which is shown, in a manner to restrain the cylinder 57 from downward movement. The clamp ring 81 is also effective to clamp the cylinder 57, the bearing retainer 69, and the antifriction bearing 78 together so that they are movable as a unit with the table 20.

To insure that the table is in a clamped position and prevent other mechanism, to be subsequently described, from functioning until the table is clamped, a limit switch LS4 is secured to the base 34 in any convenient place, here shown in Figs. 2 and 3, adjacent to the index mechanism 47, in a manner that the bottom surface of the table apron 37 will actuate the switch to a closed position when the table 20 is down and clamped. The limit switch LS4 is electrically connected in series with another limit switch, to be described, both of which are electrically connected into the control circuit and the function of which will be described with the electrical circuit.

In order to supply fluid pressure to the chambers 65 and 75 for the purpose of actuating the cylinder and piston mechanism 56 in a table raising or clamping movement, there are provided in the center post 50 two vertical passages 86 and 87 which are plugged at their lower ends and at their top terminate in a blind end. At the blind end of the passage 86 there is provided a radially extending passage 88 which passage communicates with the passage 86 and the chamber 65. To admit fluid pressure into the passage 86 there is provided another radially extending passage 89 which communicates with the passage 86 at its inner end and has its outer end plugged at the periphery of the flange 53. The passage 89 has a downwardly extending communicating passage 91 which joins a mating passage 92 provided in the hub 51. The passage 92 is connected to a source of fluid pressure by suitable tubing (not shown).

The chamber 75 is similarly connected to the source of fluid pressure by means of the vertical passage 87 which also has a radially extending communicating passage 93 at its blind end, which passage is in communication with the chamber 75. The passage 87 is likewise provided with a radially extending communicating passage 94 which passage has its outer end plugged at the periphery of the flange 53. The passage 94, likewise, has a downwardly extending communicating passage 96 which is in communication with a mating passage 97 provided in the hub 51 and which is connected to the source of fluid pressure by suitable tubing (not shown).

In operation, the mechanism 56 will be actuated in the following manner. Assuming the table to be at rest upon the base 34, fluid pressure is admitted into chamber 75 through the passages 97, 96, 94, 87 and 93. From the chamber 75 the fluid will flow into the chamber 77 by means of the passage 76 and will exert force in all directions within the chambers. Since the piston 59 is restrained from downward movement by the shoulder 62 on the center post 50, the force of the fluid pressure will be expended against the bearing retainer 69, and through the antifriction bearing 78, against the table 20 to raise the table from the base. In the raised position, it is evident that the table 20 and bearing 78 through the retainer 69, are supported on a bed of oil which minimizes friction in the rotation of the table to an index position. The fluid pressure entering into chamber 75 may be terminated by the actuation of a valve 99, diagrammatically shown in Fig. 9 and which will be more fully described. The valve 99 in terminating the flow of fluid pressure to chamber 75 directs the fluid pressure to chamber 65 through the passages 92, 91, 89, 86 and 88. Since the piston 59 is restrained from upward movement by the nut 67, the force of the pressure will be expended on the head of the cylinder 57 urging the cylinder downwardly. However, the cylinder is restrained from downward movement relative to the table 20 by the clamp ring 81, therefore the table 20 will be forced downwardly relative to the base. In moving downwardly the bearing surface 42 of the table 20 is brought into tight clamping engagement with the bearing surface 41 of the base 34 to firmly clamp the table to the base, effectively preventing movement of the table during a machining operation. After a machining operation is completed the pressure is terminated to the chamber 65 by the actuation of the valve 99 and again directed to chamber 75.

The work holding fixtures 36, previously mentioned, are hydraulically actuated for clamping a workpiece in a position to be operated on and releasing the workpiece after the work has been performed on it. To supply fluid pressure to these fixtures, advantage has been taken of the center post 50 to utilize its structure to contain a hydraulic circuit for transmitting fluid pressure to the top of the table 20 and therefrom to the fixtures 36 secured thereon. To this end, the center post 50 is provided with a central bore 100 terminating in a blind end 101 near the top of the center post. A tube 102, which is of smaller diameter than the bore 100, having threaded ends 103 and 104 is inserted into the bore with the threaded end 104 engaging a mating thread 106 in the bore near end 101. To center the tube 102 within the bore 100 a tube retainer 107 is inserted into the lower part of the bore and is internally threaded at the inner end for mating with the thread end 103 of the tube 102. The retainer 107 is provided with a chamber 108, below the tube 102, and has radially extending passages 109 which communicate with the chamber 108 and an annular groove 110 formed on the outer periphery of the retainer 107. The annular groove 110 is connected to a source of fluid pressure by means of a passage 111 extending radially through the wall of the center post 50 and connecting tubing (not shown). The annular groove 110 is isolated from the other portions of the bore 100 by O-rings 112 recessed in the periphery of the retainer 107 above and below the groove 110.

Figure 4:
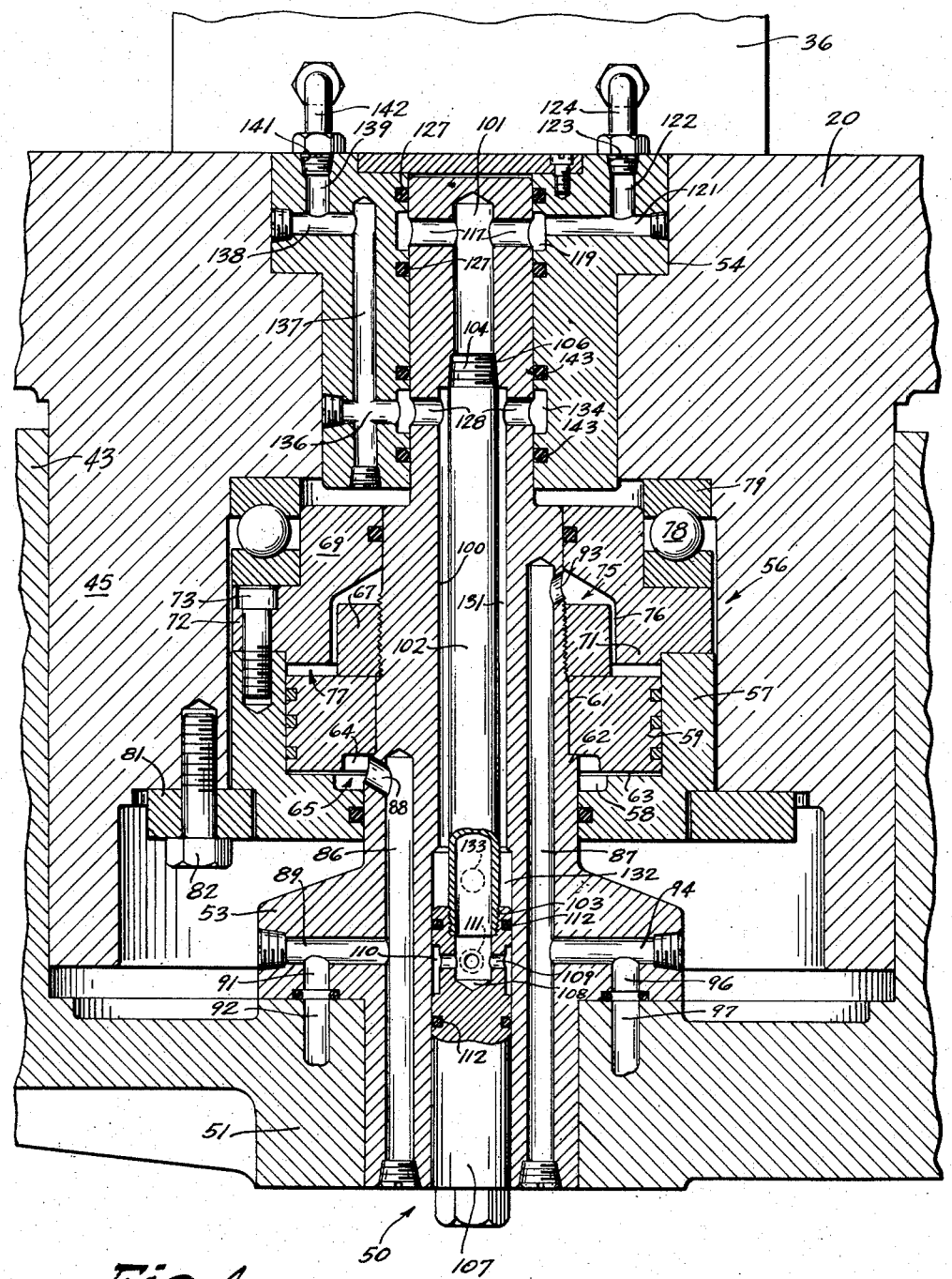
Fig. 4 is an enlarged vertical section of the index center post taken generally on a line 4—4 in Fig. 3, showing in detail the table elevating and clamping mechanism.

The upper end of the center post 50, as previously mentioned, is journalled in a collar 54 which is recessed into the top of the table 20 and secured therein by cap screws 116, as illustrated in Fig. 3, and is therefore movable with the table rotatably and vertically. To utilize the bore 100 and the tube 102 as an operative hydraulic circuit for supplying fluid pressure to the top of the table 20, a pair of passages 117, as shown in Fig. 4, are in communication with the bore 100 in the vicinity of the blind end 101, and extend radially therefrom through the center post 50 to its periphery. The passages 117 communicate, at their outer ends, with an annular groove 119 formed in the inner surface of the collar 54. The annular groove 119 is of sufficient width to enable the passages 117 to be in full communication with the groove when the table 20 is in either a raised or lowered position. The annular groove 119 is in communication with four passages 121 formed in the collar 54 and spaced 90° apart with each of the passages 121 serving to carry fluid pressure to actuate one of the fixtures 36. Only one of these passages 121 is shown and described and it extends radially through the collar 54, the outer end of which is plugged. The passage 121, in turn, has a vertical passage 122 in communication with it and extending upwardly to the top surface of the table 20 through a threaded recess 123. The threaded recess 123 receives tubing 124 which is connected to a direction valve, to be described later, to selectively direct hydraulic pressure to a clamping mechanism, to be described later, of the work holding fixture 36 for a clamping or unclamping action. The annular groove 119 is sealed on either side by O-rings 127 to prevent leakage of fluid to other portions of the bore 100.

To return hydraulic fluid from the work holding fixture 36 to a reservoir, there is provided another pair of passages 128 in the center post 50 which communicates with a passage 131 formed by the tube 102 and the wall of the bore 100. At its lower end the passage 131 terminates in a chamber 132 formed by the inner end of the retainer 107, the lower end of the tube 102 and the wall of the bore 100. The chamber 132 has a passage 133 communicating with it and which extends through the center post 50 and which in turn is connected to a reservoir return line by suitable tubing (not shown). The outer ends of the passages 128 communicate with an annular groove 134 formed in the inner surface of the collar 54. The annular groove 134 is also of sufficient width to enable the passages 128 to be in full communication with the groove when the table is in either a raised or lowered position. There are four passages 136 in communication with the annular groove 134, only one of which is shown and described, since the construction of the passages are identical but spaced 90° apart and each passage serves to pass hydraulic fluid from individual work fixtures to the passage 131. The passage 136 extends radially from the annular groove 134 through the collar 54 and is plugged at the outer surface of the collar. The passage 136 has a vertical intersecting passage 137 formed in the wall of the collar 54 which terminates in a blind end near the top of the collar. The open end of the passage 137, at the bottom surface of the collar is plugged. At the blind end of the passage 137 there is formed a radially extending passage 138 which at its inner end communicates with the passage 137 and has its outer end plugged at the periphery of the collar 54. From the top of the table 20 there is formed a passage 139 which communicates with the passage 138. The passage 139 is provided, at the table surface, with a threaded recess 141 to threadedly receive tubing 142 which is connected to a direction valve of the work holding fixture 36. The annular groove 134 is also sealed off from other portions of the bore 100 by O-rings 143 on either side.

The work holding fixtures 36 are identical in construction and operation, therefore a description of one will apply to all of the fixtures. The fixture 36 is comprised generally of a direction flow valve 144 and a piston and cylinder actuator 145, as illustrated in Fig. 9. The valve 144 comprises a valve body 146 having a rotor 147 manually positionable to two positions by a lever 148. The rotor 147 is provided with two passages 149 and 150 which when positioned by the lever 148 to one of the two positions will connect a port 151 to a port 152, and a port 153 to a port 154. When the rotor 147 is shifted to its alternate position by the lever 148 its passages 149 and 150 will function to connect port 151 with port 154 by means of the passage 149, and ports 152 will be placed in communication with port 153 by means of the passage 150.

The piston and cylinder actuator 145 serves to actuate a vise mechanism (not shown) of the fixture 36 and comprises a cylinder 155 having a piston 156 slidable therein. The piston 156 has a rod 157 secured to it with the rod extending through the cylinder 155 to connect with the vise mechanism (not shown). A chamber 158 in the actuator 145, on the head side of the piston 156 is connected to port 152 of the valve 144 by means of a conduit 159. A chamber 160 in the actuator 145, on the rod side of the piston 156 is connected to the port 154 of the direction valve 144 by means of suitable tubing 161.

Fluid pressure is supplied to the valve 144 from a reservoir 162 through a supply pipe 163 connected to the low pressure side of a pump 164. From the pump 164 fluid pressure is passed through suitable connected tubing 166 and a pressure relief valve 167 to the hydraulic circuit in the center post 50, previously described. As shown in Fig. 4, the circuit includes the passage 111, annular groove 110, passages 109, tube 102, passages 117, annular groove 119, passages 121, 122 and tubing 124; this circuit being represented in Fig. 9 as the hydraulic conduit 165 connected to the port 151 of the valve 144. The pressure relief valve 167 is also connected to a hydraulic return line 168 by means of a connecting line 169.

The fluid return circuit from the valve 144 of the work holding fixture 36 is connected to the port 153 and comprises the hydraulic return circuit in the center post 50, as previously described and shown in Fig. 4. The return circuit includes the tubing 142, passages 139, 138, 137, 136, annular groove 134, passages 128 and 131, chamber 132 and passage 133; this circuit being represented in Fig. 9, as the hydraulic conduit 142. From the return circuit 142 fluid returns to the reservoir 162 by means of the connecting line 168.

As a safety feature to insure that the indexing apparatus will not be operated when a workpiece is not positively clamped in the work holding fixture 36, there is provided a limit switch LS16 associated with the valve 144. The limit switch LS16 is a part of the electrical control circuit and is connected to the electrical circuit of a "cycle start" switch, to be subsequently described. It is so positioned that when the lever 148 of the valve 144 is manually operated to a clamping position to connect ports 151 and 152 together and ports 153 and 154 together, the limit switch LS16 will be actuated to a closed position for establishing a closed electrical circuit to the "cycle start" switch.

For rotating the table 20 in an indexing movement there is provided a compact indexing mechanism unit 47 within the housing 46 of the base 34. The unit, as illustrated in Figs. 2 and 3, comprises a gear box 170 which has a plate 171 formed integrally with it. The gear box 170 is designed to fit within the housing 46 and is secured to the base 34 by eight bolts 172, one of which is shown, which are inserted through the plate 171 and are threadedly engaged in the base 34. It is, therefore, clearly apparent that the indexing unit 47 may be easily and quickly removed from the machine by removing the bolts 172. With this arrangement, any maintenance that is required by the indexing unit will be accomplished in the shortest period of time.

Figure 5:
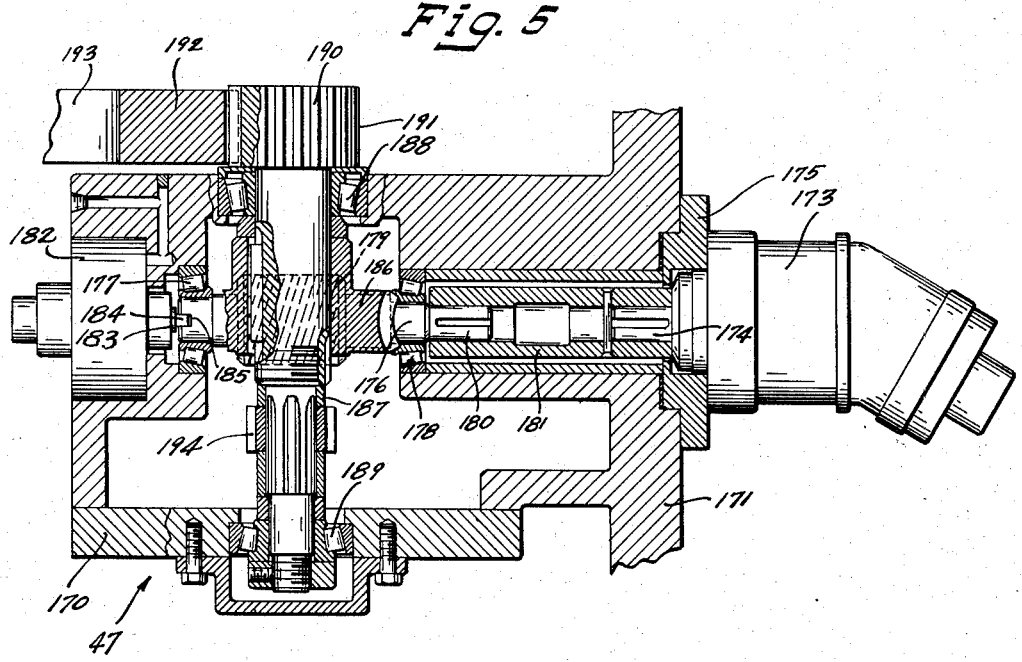
Fig. 5 is an enlarged vertical longitudinal section of the indexing unit taken generally on a line 5—5 in Fig. 2, showing the driving motor and power shaft connected to the table drive shaft.

A hydraulic driving motor 173, as illustrated in Figs. 5 and 7, having an extending driving shaft 174 is inserted into an opening in the plate 171 through a motor mounting plate 175 and secured thereto by means of bolts (not shown). The motor 173 is connected to drive a worm shaft 176, journalled in bearings 177 and 178, mounted within the gear box 170. A worm 179 is formed integrally with the shaft 176 to rotate with it. One end, 180, of the worm shaft 176 extends outwardly beyond the bearing 178 into a sleeve 181, and is keyed therein. The sleeve receives in its opposite outer end the drive shaft 174 which is also keyed therein. An oil pump 182, of any appropriate type, for supplying lubricant to the mechanism, is housed in the gear box 170 and has a driving shaft 183 provided with a tang 184 thereon which extends inwardly toward the worm shaft 176 and mates with a slot 185 provided in the worm shaft 176 for an operable driving connection therewith.

The worm 179, as shown in Figs. 5 and 7, meshes with and drives a worm gear 186 keyed to a vertical table drive pinion shaft 187. The shaft 187 is journalled in bearings 188 and 189 mounted in the top and bottom, respectively, of the gear case 170. The shaft 187 has one end 190 extending through the top of the gear case and has integrally formed thereon a pinion 191 which meshes with a table driving gear 192 to drive the table 20 in an indexing movement. The ring gear 192 is secured to a circular depending flange 193 intermediate of the periphery of the table and the circular depending inner flange 45 of the table 20. The ring gear 192 is mounted in the flange 193 concentrically to the table 20 and recessed into the outer and bottom faces of the flange 193 in a manner that the gear will clear the inside face of the upstanding circular flange 39 of the base 34 when the table is rotated, as shown in Fig. 3.

Figure 6:
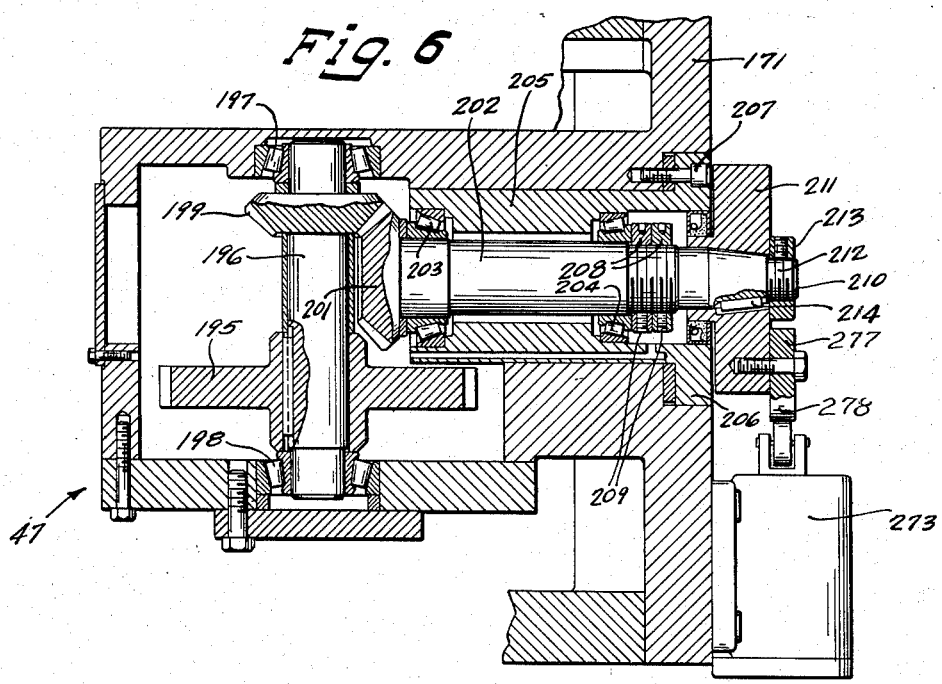
Fig. 6 is an enlarged vertical longitudinal section of the indexing unit taken generally on a line 6—6 in Fig. 2, showing the cyclic dog plate and driving shaft connected to a power transmitting shaft.

The indexing movement of the apparatus and the sequencing of the operation of the various mechanisms as well as the operation of the machine tool in which the invention is incorporated is initiated and controlled by means of dogs actuating micro-switches to energize solenoids of various valves to direct the flow of fluid pressure to the various mechanisms at a predetermined time and in a predetermined sequence. To this end, the index mechanism 47 includes a cyclic control dog plate which is rotatably driven by the hydraulic driving motor 173 at a predetermined ratio relative to the rotation of the table 20. To accomplish the driving connection to the motor 173 an indexing change shaft 194 is splined to the pinion 187, below the worm gear 186 and meshes with an index change gear 195 keyed to the lower end of the vertical dog drive shaft 196, as shown in Figs. 6 and 7. The dog drive shaft is rotatably mounted within the gear box 170 in bearings 197 and 198 which are respectively mounted in the top and bottom of the gear box 170. A bevel gear 199 is integrally formed on the upper end of the shaft 196 and is in constant meshing engagement with another bevel gear 201 that is integrally formed on the inner end of a trip dog shaft 202 horizontally disposed within the gear box 170.

The trip dog shaft 202, Fig. 6, is rotatably journalled in bearings 203 and 204 mounted in a bearing carrier 205. The bearing carrier has a flange 206 on its outer end for securing it within the gear box 170 by means of cap screws 207, one of which is shown. A pair of lock nuts 208, threadedly engaged on the shaft 202 and locked thereto by set screws 209, are provided for adjusting the bearings 203 and 204 and to adjustably retain the shaft within the carrier 205. The outer extending end 210 of the trip dog shaft, outwardly of the plate 171 is tapered for receiving a circular dog plate 211 and is also provided with a threaded end 212 for receiving a dog plate securing nut 213. The dog plate 211 is provided with a complementary tapered bore to mate with the taper of the trip dog shaft 202 and is secured to the tapered end thereof by a key 214. The ratio of rotation between the table 20 and the dog plate 211 is such that the dog plate will revolve 360° for each indexing movement of the table, irrespective of the number of indexing movements required of the table. This option being accomplished by providing the proper ratio for the gears 194 and 195. In this exemplary machine, having four index stations, the dog plate 211 will be rotated 360° as the table 20 is rotated 90°.

The index mechanism 47 also includes an index plunger mechanism generally indicated at 215 as illustrated in Figs. 3 and 8, for precisely locating the table 20 in a predetermined position after the table has been rotatably moved to the general index position by the driving motor 173. The mechanism 215 comprises an index plunger 216 slidably housed within a bore 217 in the base 34 and threadedly connected to an actuating rod 218. The plunger 216, for precisely locating the table 20, is adapted to cooperate with a slot bar 219 which is recessed into the outer periphery of the intermediate depending flange 193 of the table 20, as shown in Fig. 3. The number of slot bars 219 will correspond to the number of index stations that the table 20 is designed to have, in this instance, four. To prevent accidental unthreading of the plunger 216 from its actuating rod 218 by rotation of the plunger within the bore 217, a keyway 220 is provided longitudinally of the plunger on the free end thereof. A set screw 221 is threadedly inserted into the lower wall of the bore 217 and extends into the keyway 220 on the plunger allowing free sliding movement of the plunger 216 while effectively preventing the plunger from rotating.

The slot bars are identical in every respect, therefore, only one will be described. The slot bar 219 is formed, as illustrated in Fig. 7, to present a notch 222 of sufficient width to receive the index plunger 216. The outer periphery of the slot bar facing the plunger 216 is arcuate on either side of the notch 222. The arcuate portion 223 has a smaller radius than the arcuate portion 224, and the side wall 225 of the notch 222 adjacent to the arcuate surface 223 is inclined from the base of the notch to the outer surface of the bar. Assuming that the rotation of the table and therefore the slot bar 219 is counterclockwise, the arcuate surface 223 will be engaged by the plunger 216 which then will ride thereon until the plunger 216 clears the corner 226 of the bar. Since the plunger will be under pressure it will instantly enter into the notch 222 riding down the inclined surface 225 until it is fully engaged into the notch 222, which at the base is the exact shape of the plunger 216, to precisely locate the table in an index position. To insure that the index plunger 216 will never ride over the notch 222 the surface 224 is designed with a larger radius than that of the surface 223. Thus, the side wall 227 of the notch 222 which is adjacent to the surface 224 will be of greater length than the side wall 225. The side wall 227 is also formed perpendicular to the base of the notch 222. Therefore, if the plunger 216 riding on the surface 223 should not immediately enter the notch 222, after fully passing over the surface 223, it will contact the outer surface of the side wall 227 to effectively prevent the table from rotating beyond the predetermined position.

The actuating mechanism for the plunger 216, as illustrated in detail in Fig. 8 and diagrammatically in Fig. 9, comprises a cylinder 230 having a reduced portion 231 which is received by an opening 232 in the plate 171 to locate and support the cylinder 230. The cylinder is secured to the plate 171 by bolts 233, one of which is shown, which are inserted into a flange 234 integrally formed on the cylinder 230 and threadedly engaged into the plate 171. A piston sleeve 235 is inserted into the cylinder 230 for seating a piston 236 which has secured to it the plunger actuating rod 218. The cylinder 230 is capped by a cylinder head 237 having a reduced portion 238 which fits within the cylinder sleeve 235 and is effectively sealed therein by a sealer ring 239, for insuring an oil tight fitting of the cylinder head 237 to the cylinder 230. The cylinder head is secured to the cylinder by means of cap screws 240, one of which is shown, recessed into the cylinder head and threadedly engaged into the cylinder. The opening through which the rod 218 enters into the cylinder 230 is sealed by any suitable packing 241 and a packing nut 242.

For electrically interlocking the plunger position with the operation of other mechanism of the machine tool, there is provided an electrical circuit, to be subsequently described, having a limit switch LS3 which is secured to the top of the cylinder 230 by means of a bracket 243. To actuate the limit switch button 244, there is provided a rod 245 within a bore 246 formed in the cylinder head 237. The rod 245 has a reduced upper portion 247 which receives a spring 248. The inner end of the spring 248 abuts against a shoulder 249 of the rod 245 and is retained within the bore 246 by a cap 250 through which the upper reduced portion 247 of the rod 245 extends into contact with the button 244 of the switch LS3.

To prevent the rod 245 from entering too far into the bore 246, a limiting groove 251 is provided on the rod and a set screw 252 is threadedly inserted through the cylinder head 237 to engage the groove, so that the rod 245 is limited in axial movement within the bore 246. To move the rod 245 into engagement with the button 244 of the limit switch LS3 there is provided a plunger 253 integrally formed on the piston end of the plunger actuating rod 218. For receiving the plunger 253, when it is moved outwardly toward the cylinder head 237 by movement of the piston 236, there is provided a bore 254 in the cylinder head 237 which is plugged at the outer surface of the cylinder head. The bore 254 intersects the bore 246 housing the rod 245. The limit switch LS3 is electrically connected in series with the limit switch LS4 associated with the table 20.

To actuate the index plunger mechanism 215 for withdrawing the plunger 216 out of engagement with the slot bar 219, fluid pressure is admitted into a chamber 255 on the rod side of the piston 236. The hydraulic pressure flows from its source into a passage (not shown) constructed in the wall of the cylinder 230, which passage communicates with an annular groove 256 formed in the wall of the cylinder 230. From the groove 256 the fluid pressure passes into the chamber 255 through a series of ports 257, of which two are shown, provided in the inner end of the piston sleeve 235, to force the piston 236 outwardly to withdraw the plunger 216 from engagement with the slot bar 219.

When the piston has reached the limit of its outward travel, another series of ports 258, of which two are shown, in the piston sleeve 235 are opened, and fluid pressure then passes through these ports into another annular groove 259 which is in communication with the ports. From the annular groove 259, hydraulic pressure enters into a communicating passage 260 formed in the wall of the cylinder 230, where it passes into an intersecting passage 261 extending to the outer surface of the cylinder. From the passage 261 hydraulic fluid flows by means of a hydraulic circuit (not shown) to the passage 97 of the hydraulic circuit connected to the elevating chamber 75 of the center post 50, for the purpose of elevating the table 20 as previously described.

The passage 260 also is continued longitudinally to the end surface of the cylinder 230 abutting the plate 171, and is in communication with a passage 262 in the plate 171 and is connected to the fluid driving motor 173 by hydraulic conduit (not shown). As fluid flows to the elevating chamber 75 via the passages 260 and 261, fluid pressure is prevented from flowing to the fluid driving motor 173 via the passage 262 by a pressure relief valve 263, shown diagrammatically in Fig. 9, which is designed to open at a higher pressure than that necessary to raise the table 20 from the base 34. When the pressure in chamber 75 is sufficient to raise the table and maintain it in a raised position, the pressure will open the valve 263 allowing excess fluid pressure to flow to the driving motor 173, via connected tubing 264, to rotate the table to an index position.

To control the rate at which the table will approach the index position, and also to stop the driving motor when the table has reached an index position, there is provided, as illustrated in Fig. 9, a by-pass valve 265 connected to the discharge side of the motor 173 by means of a hydraulic conduit 266. The valve 265 is provided with an inlet port 267 and outlet port 268 and has a plunger 269 actuated by a solenoid 270 electrically connected to a limit switch LS1. The limit switch LS1 is connected to control the flow of current to the solenoid 270, and to this end, is secured to the plate 171, as shown in Fig. 2, and diagrammatically in Fig. 9, in a position to be actuated by a dog 271 adjustably secured to the dog plate 211. The outlet port 268 of the by-pass valve 265 is connected by a hydraulic line 272 to the reservoir return line 168. A deceleration valve 273, as shown in Figs. 2, 6 and 9, having an inlet port 274 and an outlet port 275 and a port closing plunger 276, is secured to the plate 171 of the index unit 47 in position for the plunger 276 to be actuated to a closed position, by a deceleration dog 277 upon rotation of the dog plate 211 on which the dog 277 is adjustably mounted.

The deceleration dog 277 is provided with an arcuate plunger contact surface 278 formed in a manner to progressively move the plunger 276 inwardly for the purpose of gradually closing the inlet port 274 of the valve 273. The inlet port 274 of the deceleration valve 273 is hydraulically connected to receive the fluid discharge from the motor 173 by a line 279 which connects with the line 266. The outlet port 275 of the deceleration valve 273 is connected to the hydraulic line 272 by a line 280.

In operation the limit switch LS1 which is electrically connected to the solenoid 270 of the by-pass valve 265, is normally closed to complete the electrical circuit for energizing the solenoid 270 to hold the plunger 269 upwardly so that the port 267 of the valve 265 is open. The deceleration dog 277, at this time, is not in contact with the plunger 276, so that the plunger is fully extended leaving the inlet 274 open. Assuming that the motor 173 is receiving fluid pressure, the motor is driven to rotate the table 20 and the dog plate 211. The fluid being exhausted by the motor returns to the reservoir 162 by the line 266 through ports 267 and 268 of the by-pass valve 265 and by the line 272 to the reservoir return line 168. At the same time, fluid exhaust may also return to the reservoir 162 by lines 266 and 279 through the deceleration valve 273 via ports 274 and 275 and by lines 280 and 272 to the reservoir return line 168.

As the table 20 is rotated, the dog 271 trips the limit switch LS1 to deenergize solenoid 270 of the valve 265 and thereby allow downward movement of the plunger 269 to close the inlet port 267 of the valve. With the port 267 closed, all of the fluid exhausted from the motor 173 flows to the reservoir 162 through the deceleration valve 273. As the table 20 approaches an indexed position, the deceleration dog 277 will be moved into contact with the deceleration plunger 276, and by action of the dog upon the plunger gradually reduce the rate of flow through the valve slowing the motor and thereby the rotation of the table 20. As the table reaches the approximate index position the deceleration dog 277 will have been rotated to move the plunger inwardly to its limit of travel and thereby completely close the inlet port 274 to stop the motor 173 and rotation of the table 20.

To continue the description of the index plunger mechanism 215, Figs. 8 and 9, after the table 20 has been indexed the flow of hydraulic pressure to the chamber 255 of the index plunger mechanism 215, is terminated by operation of the valve 99. At the same time, hydraulic pressure is admitted to a chamber 281 in the index plunger mechanism 215 by the valve 99 from a source of fluid pressure through the port 282 of a passage 283, illustrated in Fig. 8, formed in the cylinder head 237. Such pressure in the chamber 281 serves to force the piston 236 inwardly to engage the plunger 216 with the slot bar 219 in the table 20 for precisely locating the table in an index position.

As the piston 236 moves inwardly another series of ports 284, provided in the piston sleeve 235 are opened allowing excess fluid pressure to flow to the clamping chamber 65 of the elevating and clamping mechanism 56 on the center post 50 by means of a communicating annular groove 285, provided in the outer end and inner surface of the cylinder 230, which groove also communicates with a passage 286 provided longitudinally in the wall of the cylinder. The passage 286 communicates with an intersecting passage 287 in the flange portion 234 and extends radially thereof to communicate with the outer surface of the cylinder 230. The outer opening of the passage 287 communicates with a hydraulic conduit (not shown) which in turn is in communication with the passage 92 within the hub 51 of the base 34 leading to the chamber 65. As the piston 236 is moved inwardly ports 258 are closed stopping fluid pressure from flowing to the driving motor 173, and as the piston moves further inwardly to the limit of its inward travel, the fluid in chamber 255 is forced out through the ports 257 and by the connecting hydraulic supply circuit previously described, and the valve 99 back to the reservoir 162.

The passage 286 extends inwardly, beyond the intersecting passage 287, and opens at the surface of the cylinder 230 abutting the plate 171 and is in communication with another passage 289 provided in the plate 171 which in turn is connected to an actuating mechanism of the tool slides 23. Fluid pressure flowing in the passages 286 and 287 to the clamping chamber 65 is prevented from flowing to the tool slide actuator, to be described later, by a pressure relief valve 290, shown diagrammatically in Fig. 9, until the pressure in the chamber 65 is sufficient to move the table 20 downwardly and clamp it to the base 34. When the clamping pressure is sufficient, excess fluid pressure in the circuit will cause the pressure valve 290 to open allowing fluid pressure to flow to the slide mechanism 23.

As the piston 236 moves inwardly, the plunger 253 is withdrawn from contact with the limit switch actuating rod 245, and the rod under force of the spring 248 is withdrawn from contact with the limit switch button 244 closing the switch to permit the flow of electrical current necessary for the operation of the tool slide 23. The limit switch LS3 is electrically connected in series with the limit switch LS4 associated with the table 20, as previously mentioned. It is, therefore, necessary that the plunger 216 be fully engaged within the notch 222 of the slot bar 219 so that the limit switch LS3 will close and it is also necessary that the table 20 be clamped to the base 34 so that the limit switch LS4 will close before the electrical circuit to the tool slide is established. The function of the limit switches LS3 and LS4 will be fully described with the description of the electrical control circuit.

The tool slide 23 is advanced into an operating position and retracted therefrom by a piston and cylinder actuator 292 supplied with hydraulic pressure from a hydraulic circuit which supplies hydraulic pressure to the clamping chamber 65, through the pressure relief valve 290. As illustrated in Fig. 9, the actuator 292 comprises a cylinder 293 secured to the tool supporting table 31 and has a piston 294 slidably therein. The piston 294 is operably connected to the tool slide 23 by a rod 295 which advances and retracts the tool slide on the table 31. To regulate the flow of fluid pressure either to a chamber 296 on the head side of the piston 294 or to a chamber 297 on the rod side of the piston, there is provided a control panel 298 having a two position valve 299. The valve 299 is actuated to one of its two position by a solenoid 301, and to the other position by a solenoid 302. The valve 299 has an inlet port 303, a port 304 connected to the chamber 296, a port 305 connected to the chamber 297 and an exhaust port 306. The solenoid 301, when energized will position the valve 299 to connect ports 303 and 304 together to direct the flow of hydraulic pressure into the chamber 296 for actuating the piston 294 to the right as viewed in Fig. 9. At the same time, it places the port 305 in communication with the exhaust port 306 to permit fluid in the chamber 297 to be exhausted through the valve 299 by means of the port 305 and the exhaust port 306 and be returned to the reservoir 162 by means of the conduit 336. Energization of the solenoid 302 operates to position the valve 299 for effecting movement of the piston 294 in the opposite direction by connecting ports 303 and 305 together, and ports 304 and 306 together. The solenoid 301 is connected into an electrical circuit in which the limit switches LS3 and LS4 are connected and is thereby controlled by the limit switches.

Therefore, assuming that the plunger 216 is engaged with the slot bar 219, effecting the closure of the limit switch LS3 and that the table 20 is clamped to the base 34 causing the limit switch LS4 to close, the solenoid 301 is energized to position the valve 299 to connect the port 303 with the port 304 and port 305 with the port 306. Fluid pressure will sequence from the hydraulic circuit supplying fluid pressure to chamber 65 through the pressure relief valve 290 and a line 291 to the valve 299 of the control panel 298. The fluid pressure will enter the chamber 296 of the slide actuator 292 through ports 303 and 304 effecting movement of the piston 294 and thereby the slide 23 rightwardly to effect corresponding movement of the cutter 21. The exhaust fluid from the chamber 297 of the tool slide actuator 292 is discharged through the port 305 from where it is transmitted to the exhaust port 306. From the port 306 the exhaust fluid passes through a return line 336 to the reservoir 162.

The slide 23 is advanced at a rapid traverse rate until the tool 21 is in an approximate work engaging position, whereupon the tool slide 23 is advanced at a feed rate to operate upon the workpiece. To this end, a rod 307, connected to metering means within the valve 299, is actuated by a dog 308, adjustably secured to the slide 23, to position the metering means from a rapid traverse rate to a feed rate. When the slide 23 is fully advanced, a dog 309, adjustably secured to the slide 23, trips another limit switch LS5. The limit switch LS5 is electrically connected to the solenoid 302 of the valve 299, and on being tripped by the dog 309 energizes the solenoid 302 and positions the valve 299 to connect the ports 303 and 305 together and the ports 304 and 306 together. Therefore, the fluid pressure flowing to the valve 299 will be directed to the chamber 297 via ports 303 and 305, retracting the slide 23. At this time fluid in the chamber 296 will be exhausted back to the reservoir 162 via ports 304 and 306 and the return line 336. As the slide 23 is retracted, a dog 310, adjustably secured to the slide 23, will contact the rod 307 and move it upwardly to reposition the metering means within the valve 299 to its original position. When the slide 23 is fully retracted, a dog 311, also adjustably secured to the slide 23, contacts a limit switch LS10 to re-establish the electrical control circuits in a manner to be more fully described.

The direction control flow valve 99 associated with the hydraulic circuits of the index plunger mechanism 215, for the purpose of directing fluid pressure to one side or the other of the mechanism, is a four way valve, as shown in Fig. 9. The valve 99 generally comprises a valve body 315 having four ports 316, 317, 318 and 319. A movable plunger 320 is contained within the valve body 315 and is selectively positionable to either one of two positions by a pair of solenoids 321 and 322.

For the purpose of selectively passing fluid pressure through the valve 99 the plunger 320 is provided with two annular grooves 323 and 324 about its periphery. The grooves 323 and 324 function as connecting passages between ports 316 and 317, and ports 318 and 319, respectively, when the solenoid 321 is energized to position the plunger 320 rightwardly, as shown in Fig. 9. Internally formed in the plunger 320 are two passages 325 and 326 which serve to connect ports 316 and 318 together, and ports 317 and 319 together, when the solenoid 322 is energized to position the plunger 320 in a leftward position. The port 316 of the valve 99 is connected to a hydraulic pump 328 by means of suitable conduits 329. The pump 328, in turn, receives hydraulic fluid from the reservoir 162 by means of the conduit 330 connected to the supply line 163. The port 319 of the valve is connected to the reservoir 162 by a conduit 332. The port 318 is connected to the chamber 255 of the index plunger mechanism 215 by means of the conduit 331. The port 317 of the valve 99 is connected to the chamber 281 of the index plunger mechanism by means of conduit 330 and 283, the conduit 283, as shown in Fig. 9, represents the passage 283 and port 282 of the index plunger mechanism, as shown in Fig. 8.

To energize the solenoid 322 of the valve 99 for the purpose of passing fluid pressure to the chamber 255 of the index plunger mechanism to withdraw the plunger from association with the table and thereby start an indexing cycle of operation, the solenoid 322 is electrically connected into a cycle start electrical circuit, to be fully described later. Therefore, assuming the cycle start circuit to be energized, the solenoid 322 will be energized to effect movement of the plunger 320 leftwardly. Thereupon, fluid pressure from the pump 328 will flow via the conduit 329 to the valve 99. The fluid pressure is passed through the valve by means of the port 316, passage 325 and port 318. From the port 318 fluid pressure will flow through the line 331 to the chamber 255 of the index plunger mechanism 215 to move the plunger 216 out of table engagement.

Fluid in the chamber 281 of the index plunger mechanism 215 will be exhausted therefrom to return to the reservoir 162 via the port 282, the conduit 283, the conduit 330, port 317 in the valve 99, passage 326 in the plunger, port 319 and the return conduit 332.

To direct fluid pressure to the chamber 281 of index mechanism 215 to move the plunger into association with the table to precisely locate the table in an indexed position, the solenoid 321 of the valve 99 is electrically connected to a limit switch LS2, which is connected into the electrical control circuit of the apparatus. The limit switch LS2 is mounted on the plate 171 of the index mechanism 47, as shown in Figs. 2 and 9, in a manner to be actuated by a trip dog 327 which is adjustably secured to the control plate 211. The driving motor 173 in rotating the table 20 to an index position also rotates the control plate 211 as previously described. Therefore, the dog 327, upon rotation of the plate 211, will actuate the limit switch LS2 at the time the table 20 reaches an indexed position. Upon being actuated the limit switch LS2 energizes the solenoid 321 to effect movement of the plunger 320 rightwardly to a position as shown in Fig. 9. The plunger 320 on being positioned rightwardly will direct the flow of fluid pressure from the pump 328 via conduit 329 to pass through the valve 99 via port 316, annular groove 323 and port 317. From the port 317 fluid pressure flows through the conduit 330 and 283 to the chamber 281 effecting movement of the plunger 216 into association with the table 20 precisely locating the table in an indexed position.

The fluid in chamber 255 is exhausted to the reservoir 162 by means of the port 257 and the line 331 through the valve 99 by means of the port 318, annular groove 324 and port 319, and the return line 332.

For a description of the complete operation of the machine tool, in which the invention has been incorporated, attention is directed to Fig. 9, which diagrammatically illustrates the hydraulic connections between operative parts of the machine and the invention, as well as, the electrical interlocks provided to insure the synchronization of the various operative mechanisms.

Assuming that the electrical system which will be described subsequently, has been energized, and the workpiece placed in the work holding fixture 36 at the loading station "A," the rotary valve 144 is manually operated by means of the valve handle 148 to direct fluid pressure from the pump 164 through the line 166, the pressure relief valve 167 and the line 165 to enter the valve 144 through the port 151. From the port 151 fluid pressure passes through the passage 149 in the rotor 147 and thence through the port 152. From the port 152, by means of the line 159, the fluid pressure enters the chamber 158 of the actuator 145 forcing the piston 156 downwardly to clamp the workpiece in position in the work holding fixture 36. Fluid in the chamber 160 on the rod side of the piston 156, is exhausted to the reservoir 162 through a line 161 and the valve 144 via the port 154, the passage 150 in the rotor 147, the port 153, and thence to the reservoir 162 through the lines 142 and 168. Excess fluid pressure supplied by the pump 164 to the clamping chamber 158 or the unclamping chamber 160 of the fixture 36 will be returned to the reservoir by means of the pressure relief valve 167, having a relief port which opens at a higher pressure than that necessary to actuate the piston 156, and the line 169 connected to the return line 168.

As the valve 144 is manually operated to effect a clamping action, the limit switch LS16 is also closed by the actuation of the handle 148 to complete an electrical circuit to a "cycle start" switch in the electrical control circuit. Thus, when the workpiece has been clamped, a cycle of operation can be started by closing the "cycle start" switch which energizes the solenoid 322 of the valve 99 to position the plunger 320 of the valve to connect ports 316 and 318 together by means of the passage 325 in the valve plunger 320. In like manner, port 317 is connected with port 319 by means of the passage 326 in the valve plunger 320.

The "cycle start" switch, when closed also energizes the solenoid 270 to raise the plunger 269 of the by-pass valve 265, opening the inlet port 267 of the valve. Thus, the fluid pressure from the pump 328 will flow into line 329 to port 316 of the valve 99, and through passage 325 in the plunger 320 to port 318. From the port 318 fluid pressure will be carried by a line 331 to the index plunger mechanism 215 where it will enter the chamber 255 on the plunger side of the piston 236 through the port 257. The piston will be forced leftwardly, withdrawing the plunger 216 out of table engagement. The fluid in chamber 281 on the head side of the piston 236 will be exhausted through the port 282 and carried by the lines 283 and 330 to the port 317 of the valve 99. The fluid entering port 317 will be carried by the passage 326, in the plunger 320, through the port 319 and thence by the return line 332 back to the reservoir 162.

As the piston 236 of the index plunger mechanism 215, is forced leftwardly as viewed in Fig. 9, a rod 245, on the head side of the piston, engages the limit switch LS3 opening the switch to break an electrical circuit to the solenoid 301 of the valve 299 in the control panel 298, insuring that the valve 299 in the control panel will not be repositioned until a predetermined later time. As the piston 236 moves further leftwardly the port 258 is uncovered allowing excess fluid pressure to flow from the chamber 255 through the port 258 into the line 262 to the hydraulic circuit, described in conjunction with Fig. 4, of the piston and cylinder mechanism 56 associated with the table center post 50, represented in Fig. 9, as the line 97. Fluid pressure entering the chamber 75 of the mechanism 56 raises the table 20 from the supporting base. After the pressure has built up sufficiently in the chamber 75 to keep the table elevated, fluid pressure will flow from the line 262 through the pressure relief valve 263, which will open at a higher pressure than that necessary to elevate the table, and through a line 264 to the fluid driving motor 173. As the table 20 is being elevated, fluid in the chamber 65, on the opposite side of the piston 59 of the mechanism 56, will be exhausted through a hydraulic circuit, described in conjunction with Fig. 4, in the center post 50, represented here in Fig. 9 as the line 92, and be carried by lines 92 and 286 to the port 284 of the index plunger mechanism 215. However, as the piston 236 is moved leftwardly the port 284 is covered by the piston, effectively sealing this port off from communication with the chamber 281, so that fluid exhausted from chamber 65 must escape through a check valve 333 into the line 330, to join the fluid being exhausted from the chamber 281 of the index plunger mechanism 215.

The fluid driving motor 173 is actuated by the fluid pressure from the line 264, to rotate the table 20 and the dog plate 211. The fluid discharged by the driving motor returns to the reservoir 162 by a line 266, which is connected to an inlet port 267 of the by-pass valve 265, and passes through the valve and out through an outlet port 268 to a line 272 connected to the return line 168. The fluid discharge from the driving motor 173 can also return to the reservoir 162 by means of the line 266 and an intersecting connected line 279 connected to an open inlet port 274 of a deceleration valve 273 and thence through an outlet port 275 and by a line 280 connected to the line 272 into the line 168. As the table 20 approaches the index station, limit switch LS1 is actuated by the dog 271 on the dog plate 211 to deenergize solenoid 270 of valve 265 which lowers the piston 269 to close the inlet port 267 of the valve 265 thereby stopping the fluid discharge from the driving motor 173, from returning to the reservoir 162 by way of the valve 265, forcing all of the fluid discharge to return to the reservoir by way of the deceleration valve 273. As the table 20 approaches closer to the index station, a deceleration dog 277 on the dog plate 211 will actuate the plunger 276 of the deceleration valve 273, gradually reducing the rate of flow of fluid through the valve slowing the rate of rotation of the table 20. When the table is at an indexed position, the plunger 276 will have been moved into the deceleration valve its entire limit of travel thereby stopping the fluid discharge from entering the inlet port 274, effectively stopping the driving motor 173, and thereby the rotation of the table 20. As the deceleration valve 273 is closed, the limit switch LS2 is actuated by a dog 327 on the dog plate 211, to deenergize solenoid 322 and energize the solenoid 321 of the valve 99 repositioning the valve to connect ports 316 and 317 together by means of an annular groove 323 on the plunger 320 and to connect ports 318 and 319 together by means of the annular groove 324 on the plunger 320 of the valve 99. Thereafter, fluid pressure will flow from the pump 328 through the line 329 to the valve 99 to enter port 316 and pass through port 317 of the valve by means of the annular groove 323.

The fluid pressure flowing out of port 317 will be carried by the line 330 and 283 to port 282 and enter the chamber 281 of the index plunger mechanism 215, forcing the piston 236 inwardly thereby engaging the plunger 216 with the table 20 to precisely locate the table in a predetermined index position. As the piston 236 moves inwardly the rod 245 is moved out of engagement with the limit switch LS3 allowing the switch to close to partially reconnect the electrical circuit to solenoid 301 of the valve 299 of the control panel 298. As the piston 236 moves inwardly, the port 258 of the index plunger mechanism 215 is closed. The fluid in chamber 255 is exhausted through port 257 into line 331 by which it enters into the valve 99 by means of the port 318 and is passed by the annular groove 324 to the port 319 to return to the reservoir 162 by line 332.

As the fluid pressure builds up in chamber 281 to move the piston 236 rightwardly, to its limit of travel, the port 284 is uncovered allowing excess fluid pressure to pass through the port to the clamping chamber 65 of the piston and cylinder mechanism 56 on the center post 50 by means of the line 286 and 92 forcing the table 20 down on the base to clamp the table thereon. Fluid in the elevating chamber 75 of the mechanism 56 will be exhausted through the line 97 to a line 334 and through a check valve 335 to enter into the line 331 to combine with the fluid being exhausted from the chamber 255, so that the combined fluid will return to the reservoir.

When the table 20 is clamped, a limit switch LS4 which is connected in series with the limit switch LS3 is actuated by the table, to a closed position to thereby complete the electrical circuit to the solenoid 301 of the control panel 298 energizing the solenoid to position the valve 299 of the control panel 298 to connect ports 303 and 304 together and ports 305 and 306 together. When the fluid pressure in chamber 65 is sufficient to clamp the table the pressure relief valve 290 opens allowing excess fluid pressure to enter into the line 291 where it will combine with the pressure flowing from a line 337 connected to the low pressure side of the pump 328. The combined pressure in the line 291 will enter port 303 of the valve 299 of the control panel 298, and will pass into the chamber 296 by means of a port 304 forcing the piston 294, of the tool slide actuator 292 rightwardly advancing the tool slide 23 at a rapid rate towards the workpiece. As the tool slide 23 reaches an approximate work engaging position, a dog 308 on the tool slide 23 actuates the plunger 307 in the valve 299, moving it inwardly, to position the metering means within the valve to a feed position, and thereafter the tool slide 23 is advanced at a feed rate. Fluid in the chamber 297, on the rod side of the piston 294, is exhausted through the valve 299 in the control panel 298 via ports 305 and 306 to return to the reservoir 162 through a line 336.

As the tool slide 23 reaches its limit of inward travel after the cutting operation has been completed, the dog 309 on the tool slide actuates the limit switch LS5, to complete an electrical circuit to the solenoid 302, to energize the solenoid and reposition the valve 299 to connect ports 303 and 305 together and ports 304 and 306 together. Combined fluid pressure in the line 291 will now flow through the valve 299 into the chamber 297 via the ports 303 and 305, moving the piston 294 leftwardly, the fluid in the chamber 296 on the head side of the piston, is exhausted through ports 304 and 306 of the valve 299 and returns to the reservoir 162 by means of the line 336. As the tool slide 23 retracts a dog 310 actuates the plunger 307 to an extended position to reposition the metering means within the valve 299 to an orginal position. The tool slide 23 when fully retracted, through its associated dog 311 will actuate another limit switch LS10 to recondition the electrical circuit for another cycle of operation.

Figure 10:
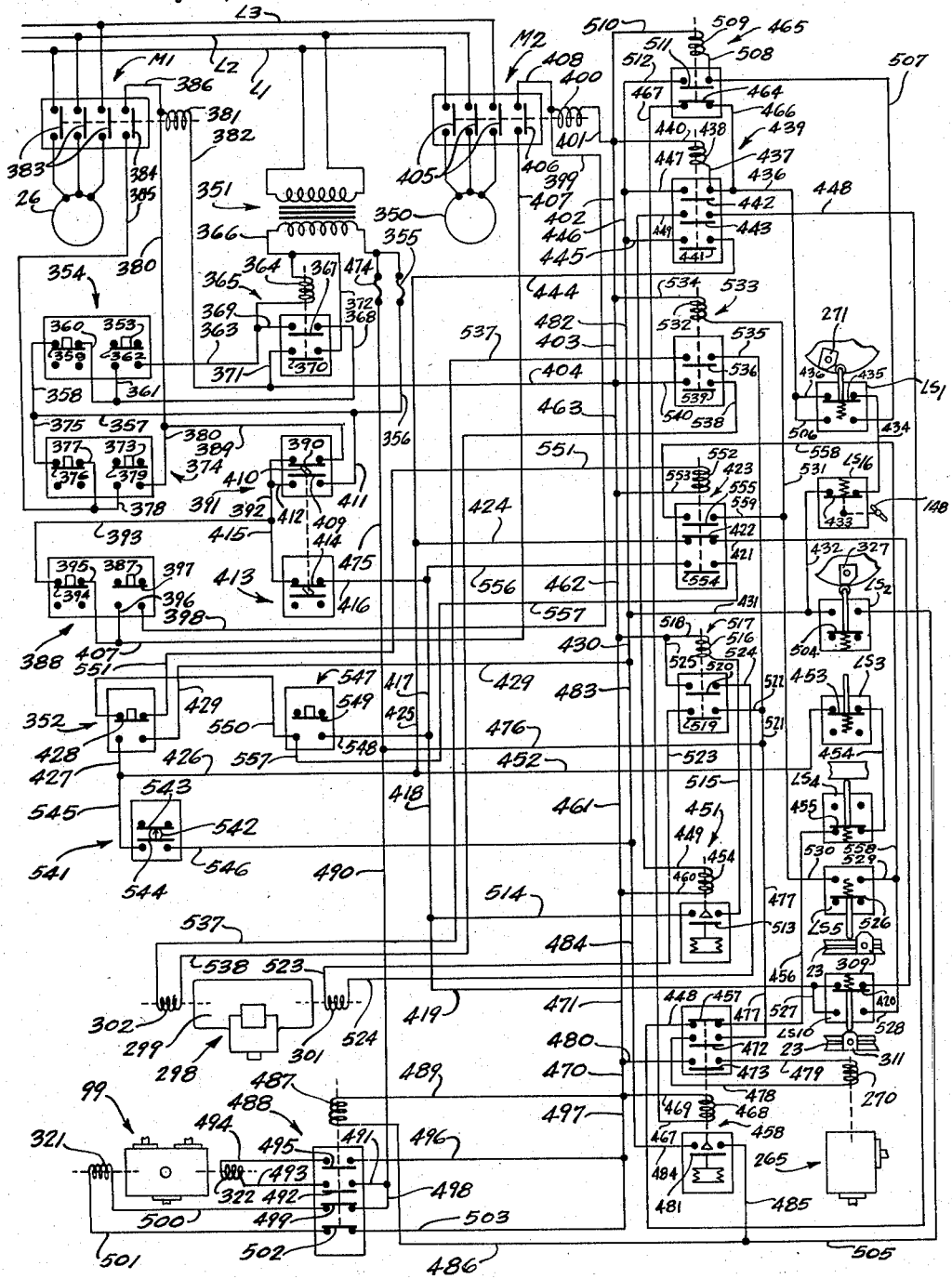

Reference is now made to Fig. 10 which illustrates the electrical control circuits and the arrangement of the electrical apparatus relative to the mechanical apparatus, for automatically controlling the operation of the illustrated machine tool embodying the features of the present invention. It is to be noted that the wiring diagram, as shown in Fig. 10, shows only one work unit, since the wiring of more units would be the same as the unit shown, but their control circuits would be wired in series to each other. The hydraulic pumps 164 and 328 are driven by one electric motor 350 through appropriate gearing (not shown).

The tool motor 26 and the pump motor 350 each have motor starters M1 and M2, respectively. The starters M1 and M2 each have one side of their contacts wired directly to the source of three phase current $L_1$, $L_2$ and $L_3$, while the control circuit is energized by the current from a transformer 351 wired directly to the lines $L_1$ and $L_2$ for single phase current.

To initiate a cycle of operation the operator must manually operate the valve 144 of the hydraulic system to clamp the workpiece in the work holding fixture 36. Operation of this valve also closes the limit switch LS16 to close an electrical circuit to the "cycle start" switch 352. The limit switch LS16 has been inserted as a safety feature, to insure that the workpiece will always be clamped before any operation of the machine can be initiated.

After valve 144 is manually operated, the operator presses a "start" button 353 of a "master" switch 354 and current flows from the transformer 351 through a fuse 355 and conductors 356, 357 and 358 to the "master" switch 354. The current now flows through a closed "stop" contact 359 of the switch 354 and conductors 360 and 361 through a now closed "start" contact 362 and conductor 363, then through a coil 364 of a relay 365 and through a conductor 366 back to the secondary of the transformer 351 to complete the circuit. Current flowing through the coil 364 of the relay 365, energizes the relay, closing the contact 367 and thereby connecting conductors 368 and 369 shunting the "start" button 353 so that the relay 365 remains energized when the "start" button 353 is released.

The circuit of the tool motor 26 has also been electrically conditioned by the closing of another contact 370 in the relay 365 to connect conductors 371 and 372 so that when a "start" button 373 of a tool motor switch 374 is actuated, current will flow from the transformer 351 through the fuse 355 and conductors 356, 357 and 375 to the tool motor switch 374, through a closed "stop" contact 376 of the switch and connected conductors 377 and 378 through a now closed "start" contact 379 of the tool motor switch 374 and by means of the conductor 380 through a coil 381 of the starter M1 thence by means of conductors 382 and 371, the closed contact 370 in relay 365 and conductors 372 and 366 back to the transformer 351. As current passes through the coil 381 of the starter M1 it is energized to close the contacts 383 therein, to connect the tool motor 26 with the three phase source of current to start the motor and drive the cutting tool 21. Also, another contact 384 in the starter M1 is closed, connecting conductors 385 and 386 which allows current to flow from the closed "stop" contact 376 of the tool motor switch 374 through conductors 377 and 385, the closed contact 384 in the starter M1 and conductor 386 through the coil 381 of the starter. Current then passes by conductors 382 and 371 through the closed contact 370 in the relay 365 and conductors 372 and 366 back to the transformer 351 thereby shunting the contact 379 of the tool motor switch 374 to complete a holding circuit which remains closed when the "start" button 373 is released.

To energize the motor 350 to drive the hydraulic pumps 164 and 328, the operator presses a "start" button 387 of a "pump motor" switch 388 and current will flow from the conductor 380 of the tool motor circuit through a conductor 389, the closed "run" contact 390 of a selector switch 391, the conductors 392 and 393, the closed "stop" contact 394 of the "pump motor" switch 388, the conductors 395 and 396, through a now closed "start" contact 397 of the "pump motor" switch 388 and the conductors 398 and 399 through the coil 400 of the starter M2, thence through conductors 401, 402, 403, 404 and 371 through the closed contact 370 in relay 365, to return to the transformer 351 by means of the conductors 372 and 366 to complete the circuit and energize the starter M2. Upon being energized three contacts 405 in the starter M2 are closed, allowing current to flow from the lines L₁, L₂ and L₃ to the pump motor 350 to energize it, causing the pumps 164 and 328 to supply fluid pressure to the hydraulic circuits, as illustrated in Fig. 9. Also, another contact 406 is closed, connecting conductors 407 and 408 allowing current to flow from the closed "stop" contact 394 of the "pump motor" switch 388 through conductors 395 and 407, the now closed contact 406 of starter M2 and conductors 408 through the coil 400 of the starter M2, thence by means of conductors 401, 402, 403, 404 and 371 through the closed contact 370 of relay 365 and conductors 372 and 366 to the transformer 351 to complete the circuit to shunt the "start" button 387 of the "pump motor" switch 388 to self-maintain the starter M2 when the "start" button 387 is released.

The selector switch 391 has two positions "run" and "set-up," each position having a contact 390 and 409 respectively. The switch is manually positionable to one or the other of the two positions by a lever 410. In the "run" position the electrical circuit for the motor 350, driving the pumps 164 and 328, is energized through the electrical circuit of the tool motor 26. In other words, before the motor 350 can be energized to drive the pumps 164 and 328, the motor 26 driving the cutter tool must first be energized. This arrangement is desirable when the machine has been set-up for a production run but is not satisfactory when adjusting the tool slides and cutters prior to a production run. To adjust the tool slide and cutter it is necessary that the hydraulic pumps be operating in order that the slides may be advanced and retracted but it is not desirable that the cutters be operated. Therefore, the selector switch 391 will be manually positioned into the "set-up" position closing the contact 409 and opening the "run" contacts 390, so that current will flow from the transformer 351 through the fuse 355, the conductors 356 and 411, the now closed "set-up" contact 409 of the selector switch 391 and conductors 412, 392 and 393 to the "pump motor" switch 388, by-passing the electrical circuit of the tool motor 26.

The "cycle start" circuit which controls the functioning of the various mechanism of the invention is also energized through the selector switch 391. To insure that the "cycle start" circuit cannot be energized when the selector switch 391 is in the "set-up" position another selector switch 413 having two positions corresponding to the selector switch 391 is ganged to the selector switch 391. When the selector switch 391 is set to the "run" position the selector switch 413 is positioned in a manner that a contact 414 is closed connecting the electrical circuit of the "cycle start" switch 352 into the electrical circuit of the tool motor 26. If the selector switch 391 is set to the "set-up" position closing contact 409 therein, the selector switch 413 will be mechanically positioned into a non-connected position, thereby insuring that the "cycle start" switch 352 is inoperative.

To continue the description of the electrical circuits with the selector switches 391 and 413 in "run" position for an automatic single cycle operation of the machine, the "cycle start" switch 352 is actuated and current flows from the selector switch 391 through conductors 392 and 415, the closed "run" contact 414 of the selector switch 413 and conductors 416, 417, 418 and 419 to the limit switch LS10, through the normally open now held closed contact 420 of the switch, which is being held closed by the dog 311 on the retracted slide 23 as shown in Figs. 9 and 10, and a conductor 421 through a closed contact 422 of a deenergized relay 423, thence through conductors 424, 425, 426 and 427, the now closed contact 428 of the "cycle start" switch 352 and conductors 429, 430, 431 and 432 through the held closed contact 433 of the limit switch LS16, the limit switch LS16 being closed by the manual operation of the valve 144 through the operation of the handle 148. From the limit switch LS16 current passes through the conductor 434, the normally closed contact 435 of limit switch LS1 and conductors 436 and 437 to pass through the coil 438 of relay 439 and conductors 440 and 402 to the conductor 404 to return to the transformer 351 to complete the circuit and energize relay 439. Upon being energized the contacts 441, 442 and 443 of the relay 439 are closed and current will flow from the selector switch 413 via the conductors 416, 417, 418 and 419 through the limit switch LS10 and conductor 421 through the closed contact 422 of relay 423 and conductor 424 and 444 through the closed contact 441 in relay 439 and conductors 445, 446 and 447 through another closed contact 442 in relay 439 and conductor 437 through the coil 438 of the relay and conductors 440 and 402 to the conductor 404 to return to the transformer 351 to complete the circuit. Thus, the "cycle start" switch 352 is shunted and relay 439 will remain energized. Also the contact 443 is closed in the relay 439 to connect conductors 448 and 449 to complete a circuit to a coil 454 of a relay 451 permitting the current to flow from the closed contact 422 of relay 423 by conductors 424, 425 and 452 through the normally closed contact 453 of the limit switch LS3 and conductors 454 through a closed contact 455 of limit switch LS4. The contact 455 in the limit switch LS4 is held closed by action of the table 20 being in a lowered and clamped position and engaging the limit switch as previously described. Current will now pass through the limit switch LS4 and flow through the conductor 456 and the normally closed contact 457, of a deenergized relay 458, the conductor 448, the closed contact 443 of the relay 439 and conductor 449, through the coil 454 of relay 451 and thence through conductors 460, 461, 462 and 463 to the line 404 to return to the transformer 351 to complete the circuit which would energize relay 451 and energize other relays to energize the solenoid 301 to advance the tool slide 23. However, the table 20 has not been indexed therefore the advancing of the tool slide 23, at this time, is not permissible.

Therefore, relay 451 is kept deenergized until a later time by connecting the closed contact 464 in the deenergized relay 465 to the conductor 436, which is connected to the coil 438 of the relay 439, by means of a conductor 466 so that current while passing to the coil 438 of the relay 439 will also flow by the conductor 466 through the closed contact 464 of the relay 465 and the conductor 467 to pass through the coil 468 of the relay 458 and then flow by the conductors 469, 470, 471, 461, 462 and 463 to the conductor 404 to return to the transformer 351 to complete the circuit to energize the relay 458 thereby opening the closed contact 457 of the relay 458 to break the connection between the conductors 456 and 448 to keep relay 451 deenergized since the coil 454 of relay 451 is supplied with current from the conductor 448 by means of the conductor 449.

Energizing relay 458 also closes contacts 472 and 473 in the relay so that current from the transformer 351 will flow through the fuse 474, the conductors 475, 476 and 477 through now closed contacts 472 of relay 458 and conductor 478 through the solenoid 270 of the by-pass valve 265 and conductor 479 through the closed contact 473 of relay 458 and conductors 480, 471, 461, 462 and 463 to the conductor 404 and back to the transformer 351 to complete the circuit energizing solenoid 270 to open the valve 265 allowing fluid discharging from the driving motor 173 to pass through the valve and return to the reservoir.

When the time delay contact 481 in relay 458 closes current will flow from the contact 441 in relay 439 by conductors 445, 482, 430, 483 and 484 through the closed contact 481 of relay 458 and conductor 485 and 486 through the coil 487 of relay 488 and conductors 489, 470, 471, 461, 462 and 463 to the conductor 404 to return to the transformer 351 to complete the circuit energizing relay 488. As relay 488 is energized, solenoid 322 of valve 99 is energized by the closing of open contacts 492 and 493 in the relay 488. Current will now flow from the transformer 351 through the fuse 474 and conductors 475, 490 and 491 through the now closed contacts 492 of relay 488 and conductor 493 through solenoid 322 and conductor 494 through the other now closed contact 495 of the relay and conductors 496, 497, 470, 471, 461, 462 and 463 to the conductor 404 and back to the transformer 351 to complete the circuit energizing solenoid 322; at the same time a pair of closed contacts 499 and 502 in relay 488 are opened to break the connections between conductors 498 and 500 and conductors 501 and 503 to deenergize solenoid 321. When the solenoid 322 is energized valve 99 is positioned to permit fluid pressure to flow to chamber 255 of the index plunger mechanism 215 to withdraw the plunger 216 from table engagement and, also, to raise the table from the base. As the plunger is withdrawn limit switch LS3 is held opened and as the table is raised limit switch LS4 is released to open position. This insures that relay 451 cannot be energized and therefore the dependent solenoid 301 of the valve 299 cannot be energized to advance the work tool slide 23 until the table has been positively indexed and clamped.

As the table is indexed, limit switch LS2 is released and closes, by reason of the dog 327 being moved out of engagement with the switch. Current now flows to the coil 487 of relay 488 from the relay 439 by means of conductors 445, 482 and 431, the now closed contact 504 of limit switch LS2, conductors 505 and 486, the coil 487 of relay 488 to the conductor 489 to return to the transformer 351 thereby maintaining the relay 488 when the limit switch LS1 is tripped by the dog 271 to break the connection between lines 434 and 436 which deenergizes relay 458 and thereby opens the time-delay contact 481 in the relay which would deenergize relay 488.

As the table approaches an index station, limit switch LS1 is tripped, deenergizing relay 458. In being tripped the contact 435 in the switch is moved to connect conductors 506 and 507 and in being moved breaks the connection between conductors 434 and 436, allowing current to flow from the selector switch 413 through conductors 416, 417, 418 and 419 through the closed contact 420 in limit switch LS10, by action of the dog 311 on the limit switch, through conductor 421, the normally closed contacts 422 in relay 423, conductors 424 and 444, through normally opened now closed contact 441 in relay 439 thence by means of conductors 445, 446 and 447, the closed contact 442 in relay 439, the conductors 436 and 506, through the closed contact 435 in limit switch LS1 and conductors 507 and 508 through the coil 509 of relay 465 to continue on through conductors 510, 402, and 403 to the conductor 404 to return to the transformer 351 to complete the circuit. This circuit energizes the relay 465 which opens the normally closed contacts 464 in the relay breaking the connection between conductors 466 and 467 to deenergize relay 458 and solenoid 270 of the by-pass valve 265. This also keeps the relay 458 and solenoid 270 deenergized when the limit switch LS1 is released to its normal position and re-connects conductors 434 and 436. As relay 465 is energized the normally open contact 511 in the relay is closed, connecting the conductors 507 and 512 so that current will flow from the closed contacts 441 of the relay 439 through conductors 445, 446 and 512, the now closed contacts 511 of relay 465, the conductor 508 and through the coil 509 thence through conductors 510, 402 and 403 to the conductor 404 to return to the transformer 351 to complete the circuit to self-maintain relay 465.

As the table reaches an index station, limit switch LS2 is opened, by the action of dog 327, breaking the connection between conductors 431 and 505 to deenergize relay 488 and thereby deenergize solenoid 322 and energizing solenoid 321. Thus, the valve 99 is repositioned to direct hydraulic pressure to chamber 281 of the index plunger mechanism 215 forcing the plunger 216 into table engagement and allowing pressure to flow into the clamping chamber 65 to clamp the table. As the plunger 216 moves in, limit switch LS3 is released and closes to re-connect conductors 452 and 454 and as the table is clamped limit switch LS4 is closed re-connecting conductors 454 and 456. Since relay 458 has previously been deenergized and the normally closed contacts 457 in the relay closed, the circuit to the coil 454 of relay 451 is now completed to energize the relay which closes the time-delay contact 513 of the relay. Current will now flow from the selector switch 413 through conductors 416, 417, 418 and 514, through the time-delay contact 513 in relay 451 and by means of conductor 515 through the coil 516 of relay 517, thence through conductors 518, 462, 463 to the conductor 404, to return to the transformer 351 to complete the circuit energizing the relay 517 and closing the contacts 519 and 520 therein. Current now flows from the transformer 351 through the fuse 474 and conductors 475, 476, 521 and 522, through the now closed contact 519 in relay 517 and conductor 523, through the solenoid 301 of the valve 299 of the control panel 298 and conductor 524, through the other now closed contact 520 in relay 517 and conductors 525, 518, 462 and 463 to the conductor 404, to return to the transformer 351 to complete the circuit to momentarily energize solenoid 301 to position the valve 299 in a manner to advance the work unit slide 23. As the slide advances, limit switch LS10 is released to its normal position, which opens the contact 420 to disconnect conductors 419 and 421 which deenergizes relays 451 and 517 and solenoid 301; LS10 on returning to its normal position connects conductors 527 and 528 together.

When the work slide 23 has been fully advanced, the limit switch LS5 is closed, by action of the dog 309, to move the contact 526 to connect conductors 529 and 530. Current now flows from the selector switch 413 through the conductors 416, 417, 418, 419 and 527, through the contact 420 of limit switch LS10 and conductors 528 and 529, through the now held closed contact 526 of limit switch LS5 and conductors 530 and 531, through the coil 532 of relay 533 and conductors 534 and 403 to the conductor 404 to complete the circuit energizing relay 533 closing the contacts therein. Current will now flow from the transformer 351 through the fuse 474 and conductors 475, 476, 521 and 535, the now closed contact 536 in relay 533 and conductor 537, through the solenoid 302 of the valve 299 of the control panel 298 and then by means of conductor 538 through the now closed contact 539 in the relay 533 and conductor 540 to the conductor 404 to complete the circuit to momentarily energize solenoid 302 to reposition the valve 299 of the control panel 298 to retract the slide 23. As the slide retracts limit switch LS5 is released to an open position, deenergizing relay 533 and solenoid 302. When the slide is fully retracted limit switch LS10 is again actuated by the dog 311, breaking the connection between conductors 527 and 528 and re-connecting conductors 419 and 421 to complete a full cycle of operation and to re-condition the electrical circuits for another cycle of operation.

To have the machine automatically repeat the operating cycle, without the necessity of actuating the "cycle start" switch 352, another selector switch 541 has been incorporated into the "cycle start" switch circuit. The selector switch 541 is provided with two positions and selectively actuated to one or the other of the positions by a manual control 542. One of the positions, which is the "hand" position, has a contact 543 which is not electrically active, the switch 541 when positioned in this position necessitates the actuation of the "cycle start" switch 352 after each complete cycle of the machine. In the second or "auto" position there is provided a contact 544 which is electrically active. Thus, assuming the tool slide 23 has been retracted, the selector switch 541 set in the "auto" position closing contact 544 in the switch and the limit switch LS10 contacted by the dog 311 thereby moving the contact 420 of the limit switch LS10 to connect conductors 419 and 421 together, the current flowing from the selector switch 413 to the contact 420 of the limit switch LS10 will flow therefrom by the conductor 421 to the closed contact 422 of relay 423 and thence by means of conductors 424, 425, 426 and 545 through the closed contact 544 in the selector switch 541, through conductors 546, 483, 430, 431 and 432 to the contact 433 of the limit switch LS16. In this manner, the operator need only to place a workpiece in the work holding fixture and manually actuate the valve handle 148 of the valve 144 of the fixture 36 to a clamp position to repeat a complete operating cycle without the necessity of actuating the "cycle start" switch 352.

If for any reason it is found desirable or necessary to immediately return the tool slide 23 to a retracted position, without progressing the entire machine through a complete operating cycle, there has been provided an emergency return control circuit. To this end, an emergency return switch 547 when actuated will permit current to flow from the selector switch 413 through conductors 416, 417 and 548, through now closed contact 549 of the "emergency return" switch 547 and then through conductor 550 to the "cycle start" switch 352 passing through the switch to continue on through the conductor 551, the coil 552 of the relay 423 and conductors 553 and 463 to the conductor 404 to complete the circuit energizing the relay 423 which closes the normally open contacts 554 and 555 and opens the normally closed contact 422. Thus, the connection between conductors 421 and 424 is broken which deenergizes the relays 465, 439, 451 and 517 to end slide advancement. In closing the normally open contacts in the relay 423, current will flow from the selector switch 413 through conductors 416 and 556, the now closed normally open contact 554 of the relay 423, conductor 557 to the conductor 550 of the emergency return circuit to self-maintain the relay 423. Current also is flowing from the selector switch 413 through conductors 416, 417, 418, 419 and 527 through the now closed normally closed contact 420, since slide 23 is advancing and limit switch LS10 is thereby returned to its normal position, and conductors 528 and 558 through the now closed contact 555 in the relay 423 and conductors 559 and 531 to the coil 532 of relay 533 to energize the relay and thereby momentarily energize solenoid 302 of the valve 299 in the control panel 298 repositioning the valve to direct fluid pressure to chamber 297 to immediately retract the tool slide 23. Since the relay 423 is energized and the normally closed contact 422 in the relay is opened, re-cycling of the machine is prevented. The circuits, to operate the machine, can now only be reestablished by actuating the "cycle start" switch 352 which when actuated will deenergize the relay 423 and establish the tool slide 23 advancing circuit as previously described.

The principles of this invention having now been fully explained in connection with the foregoing description, we hereby claim as our invention:

1. In a machine tool, a base, a rotary table mounted on said base for rotational movement relative to said base, a source of power connected to rotate said table step-by-step to a series of equidistant index positions, a dog plate connected to be rotated by said source of power a full revolution as said table is rotated from one index position to the succeeding index position, a trip dog mounted on said dog plate, a control element connected to control the operation of said source of power and to be actuated by said trip dog as it moves with said dog plate to progressively reduce the output of said source of power and thereby decelerate the rate of rotation of said rotary table at a uniform rate until said table reaches a predetermined index position when the output of said source of power will be zero, and means operable to render said control element ineffective and thereby effect full output of said source of power, whereby said rotary table will be indexed step-by-step to a plurality of positions.

2. In a machine tool, a base, a member movably mounted on said base, a source of hydraulic pressure, a hydraulic motor connected to be actuated by said source of hydraulic pressure and to drive said movable member in its path of travel, a piston and cylinder mechanism connected to be actuated by said source of hydraulic pressure and to exert a force upon said movable member in a direction to force it against said base to securely clamp it in position, control means connected to control the flow of hydraulic pressure from said source to said hydraulic motor and to said piston and cylinder mechanism, a dog plate connected to be moved by said motor with said movable member, and a plurality of dogs mounted on said dog plate to move with it in position to actuate said control means for effecting successive operation of said motor and piston and cylinder mechanism so that said piston and cylinder mechanism is actuated to release said movable member before said motor is operated, and to clamp said movable member in position after operation of said motor is terminated when the movable member has been driven the desired distance.

3. In a machine tool, a base, a member movably mounted on said base, a source of fluid pressure, a fluid motor connected to be actuated by said source of fluid pressure and to drive said movable member in its path of travel, a piston and cylinder mechanism connected to be actuated by said source of fluid pressure and to exert a force upon said movable member in a manner to force it into tight engagement with said base to clamp it in the engaged position, said piston and cylinder mechanism comprising, a piston fixed to the base and a cylinder containing said piston and secured to the table to move with it, a valve connected to selectively direct fluid pressure from said source of fluid pressure when actuated to one side of said cylinder to effect a clamping action by said mechanism or to the opposite side of said cylinder to effect a releasing action, means connected to said valve to selectively position said valve, a dog plate connected to be rotated by said fluid motor as said movable member is driven, said dog plate being rotated a full revolution as said movable member is driven a predetermined amount, a dog mounted on said plate adapted to actuate said valve positioning means for effecting successive operation of said motor and piston and cylinder mechanism so that said piston and cylinder mechanism is actuated to release said movable member before said motor is operated, and to clamp said movable member in position after operation of said motor is stopped.

4. In a machine tool, a base, a member movably mounted on said base, a source of fluid pressure, a fluid motor connected to be actuated by said source of fluid pressure and to drive said movable member, a piston and cylinder mechanism connected to be actuated by said source of fluid pressure and to exert a force upon said movable member to effectively clamp said movable member to said base, control means connected to control the flow of fluid pressure from said source to said driving motor and said piston and cylinder mechanism, a deceleration valve connected to receive fluid discharge from said driving motor and operable to progressively meter said fluid discharge, a dog plate connected to be moved by said driving motor with said movable member, a first dog mounted on said plate to move with it in a position to actuate said deceleration valve to meter the fluid discharge from said driving motor from full flow to no flow progressively at a uniform rate until said motor and said movable member are stopped at a predetermined position, and a second dog mounted on said dog plate to move with it in a position to actuate said control means for effecting successive operation of said motor and said piston and cylinder mechanism so that said piston and cylinder mechanism is actuated to release said movable member before said motor is operated, and to clamp said movable member in position after said deceleration valve is actuated to stop said motor.

5. In a machine tool, a base, a member movably mounted on said base, a source of fluid pressure, a fluid motor connected to drive said movable member in its path of travel when actuated, a piston and cylinder mechanism secured to said base and associated with said movable member and operable when actuated in one direction to exert a force upon said movable member to force it against said base to clamp it in position and operable when actuated in an opposite direction to release said movable member from engagement with said base, a deceleration valve connected to receive fluid discharge from said motor and to pass said discharge to a reservoir and operable to progressively meter said discharge when actuated, control means connected to control the flow of fluid pressure from said source to one side or the other of said piston and cylinder mechanism, said control means being normally positioned to direct fluid pressure to said piston and cylinder mechanism to effect a clamping engagement of said movable member, means to move said control means from its normal position to an alternate position thereby directing fluid pressure to said piston and cylinder mechanism to effect a release of said movable member, a dog plate connected to be rotated by said driving motor simultaneously with said movable member, means to connect the fluid motor to said source of fluid pressure to actuate it after said movable member has been released, a first dog mounted on said dog plate to move with it in a position to gradually actuate said deceleration valve to thereby decelerate the rate of movement of said movable member at a uniform rate until it is stopped at a predetermined position, and a second dog mounted on said dog plate to move with it in position to actuate said control means from its alternate position to its normal position as said movable member is stopped to thereby direct the fluid pressure to said clamping chamber.

6. In a machine tool, a base, a member movably mounted on said base, a source of fluid pressure, a fluid driving motor connected to be actuated by said source of fluid pressure and to drive said movable member in its path of travel, a piston and cylinder mechanism connected to be actuated by said source of fluid pressure and to exert a force upon said movable member to force it against said base thereby securely clamping it in position, a deceleration valve connected to receive fluid discharge from said driving motor and to return said fluid discharge to a reservoir and operable to meter said discharge when actuated, a direction valve connected to receive fluid discharge from said driving motor and to return said fluid discharge to said reservoir and when actuated to stop the return of discharge to said reservoir via said direction valve, control means connected to control the flow of fluid pressure from said source to said fluid motor and to said piston and cylinder mechanism, a dog plate connected to be moved by said motor with said movable member, a dog mounted on said dog plate to move with it in position to actuate said direction valve thereby effecting the return of the fluid discharge from said fluid motor to said reservoir by means of said deceleration valve, a deceleration dog mounted on said dog plate to move with it in position to progressively actuate said deceleration valve to effect a metering of said fluid discharge returning to said reservoir thereby gradually reducing the rate at which said movable member is driven and to stop said motor and said movable member at a predetermined position, and a third dog mounted on said dog plate to move with it in position to actuate said control means for effecting successive operation of said motor and piston and cylinder mechanism so that said piston and cylinder mechanism is actuated to release said movable member before said motor is operated, and to clamp said movable member in position after operation of said motor has been stopped when the movable member has been driven the desired distance.

7. In a machine tool, a base, a member movably mounted on said base, a fluid motor connected to drive said movable member in its path of travel when actuated, a source of fluid pressure connected to supply fluid pressure to said fluid motor to actuate it, a normally open direction valve connected to receive fluid discharge from said motor and to direct the flow of discharge directly to a reservoir when open, a deceleration valve connected to receive fluid discharge from said motor and connected to pass said discharge to a reservoir and operable to control the rate of flow of said fluid discharge to thereby control the rate of operation of said motor, a dog plate connected to be driven by said fluid motor a full revolution for each movement of said movable member from one index position to a succeeding index position, a first dog carried by said dog plate in position to actuate said direction valve to a close position as it moves with said dog plate to direct all of said fluid discharge to said deceleration valve, a second dog carried by said dog plate in position to actuate said deceleration valve after said direction valve has been closed and as said second dog moves with said dog plate to progressively reduce the rate of flow of said fluid discharge passing through said valve to reduce the rate of operation of said motor and thereby decelerate said movable member at a uniform rate until it is stopped at a predetermined index position, and means to reposition said direction valve to an open position, whereby said movable member is driven step-by-step to a series of predetermined index positions with said dog plate completing a full revolution for each movement of the movable member from one index position to the succeeding index position.

8. In a machine tool, a base, a movable member mounted on said base and having a plurality of openings associated therewith, a source of fluid pressure, a motor connected to be actuated by said fluid pressure and to move said movable member in its path of travel, a plunger movable selectively into and out of engagement with the individual openings associated with said movable member for locating the movable member in a desired index position, a fluid pressure actuator connected to said plunger and connected to receive fluid pressure on one side or the other of said actuator, a piston and cylinder mechanism connected to be actuated by said fluid pressure and to exert a force on said movable member in a manner to clamp said movable member to said base, said piston and cylinder mechanism connected to receive fluid pressure after said plunger actuator has moved said plunger into engagement with said movable member to precisely locate it in a predetermined position, a deceleration valve connected to receive fluid discharge from said motor and operable to meter said discharge when actuated, control means connected to control the flow of fluid pressure to one side or the other of said plunger actuator, a dog plate connected to be rotated by said motor as said movable member is moved, a dog mounted on said dog plate to move with it in position to actuate said deceleration valve to effect progressive metering of the fluid discharge from said motor from full flow to no flow thereby stopping said motor and said movable member at a predetermined position, and a second dog mounted on said dog plate in position to actuate said control means for effecting successive operation of said plunger said piston and cylinder mechanism and said driving motor so that said plunger is moved out of engagement with the openings associated with said movable member and said piston and cylinder mechanism is actuated to release said movable member before said motor is operated, and to actuate said plunger into engagement with the openings associated with said movable member and to clamp said movable member in position after operation of said motor is stopped when the movable member has been driven the desired distance.

9. In an indexing mechanism the combination of a base, a table rotatably mounted on said base and having a plurality of openings associated therewith, a source of fluid pressure, a fluid driving motor connected to rotate said table to a series of predetermined index positions, a cyclic control mechanism operably connected to be rotated by said fluid motor, a plunger movable into or out of engagement with the openings associated with said table to effect precise positioning of said table, a piston and cylinder actuator connected to actuate said plunger, means connecting said actuator with said source of fluid pressure, a control valve interposed in the aforesaid connecting means to control the flow of fluid pressure to one side or the other of said piston of said actuator and operably connected to be actuated by said cyclic control mechanism, a fluid pressure mechanism operable to elevate said table from said base or to clamp said table to said base when actuated comprising a cylinder secured to said table and a piston secured to said base and restrained from vertical movement within said cylinder, means connecting said fluid pressure mechanism to said source of fluid pressure in a manner to effect a table elevating action of said mechanism after said plunger has been moved out of engagement with the openings associated with said table, means connecting said driving motor with said source of fluid pressure to effect an indexing action on said table after said table has been elevated, a deceleration valve connected to receive fluid discharge from said motor and operable to progressively meter said discharge to stop said motor and thereby said table in an index position when said deceleration valve is actuated, a direction flow valve connected to direct the fluid discharge from said motor to a reservoir and operable to direct the flow of discharge to said deceleration valve when actuated, said direction valve being mounted in a position to be actuated by said cyclic control mechanism, means to actuate said control valve to direct the flow of fluid pressure to said actuator of said plunger to effect withdrawal of said plunger from the openings associated with said table, and means to connect the source of fluid pressure with said fluid pressure mechanism to effect a table clamping action of said mechanism after said plunger has been engaged with the openings associated with said table.

10. In a machine tool having a table rotatably indexible to a series of stations and having a plurality of openings associated therewith the combination of, a source of fluid pressure, a table locating plunger engageable selectively with the openings associated with the table, to thereby locate said table in a predetermined position, an actuator connected to actuate said plunger, means to supply fluid pressure from a source to said plunger actuator to effect withdrawal of said plunger from engagement with the openings associated with the table, a piston and cylinder mechanism connected to said table, means to supply fluid pressure to one side of said piston of said piston and cylinder mechanism to raise said table from said base after said plunger has been withdrawn from table engagement, a fluid driving motor connected to rotate said table when actuated, means to supply fluid pressure to said motor after said table has been raised thereby driving said table in an indexing movement, a solenoid actuated direction valve connected to receive fluid discharge from said motor and to pass the discharge to a reservoir, a deceleration valve connected to receive fluid discharge from said motor and pass said discharge to a reservoir and operable to meter said discharge the arrangement being such that said direction valve and said deceleration valve are hydraulically in parallel, a dog plate connected to said fluid motor in a manner to be rotated by said motor a full revolution for every indexing movement of said table, a first dog adjustably secured to said dog plate adapted to actuate means to deenergize said solenoid of said direction valve upon rotation of said plate thereby effecting closure of said valve to direct all of the fluid discharge from said motor to return to said reservoir via said deceleration valve, a deceleration dog adjustably secured to said dog plate and adapted to actuate said deceleration valve upon rotation of said plate to effect metering of the fluid discharge from full flow to no flow whereby said motor is stopped and said table is indexed, a third dog adjustably secured to said dog plate and adapted to actuate said supply means to supply fluid pressure to said plunger actuator to effect movement of said plunger into engagement with the openings associated with the table thereby precisely locating the table in a predetermined position, and means to actuate said supply means to supply fluid pressure to the opposite side of said piston and cylinder mechanism after said plunger has been engaged with the openings associated with said table to clamp the table in an indexed position.

11. In a machine tool, a base, a work supporting table supported by said base for rotational and axial movement relative thereto, a cylinder secured to the underside of said work supporting table, a piston disposed within said cylinder and fixedly supported by said base, and a source of fluid pressure connected to supply pressure to said cylinder on either side of said piston selectively so that when the fluid pressure is directed into the cylinder below the piston it will draw the table downwardly into tight engagement with said base to firmly clamp it in position, and when the fluid pressure is directed into the cylinder above the piston it will raise the table off of the base and support it in this position to render it freely rotatable, whereby the fluid pressure functions selectively to clamp the table in position or to support the table on a column of fluid pressure to reduce the frictional resistances to its rotation to a minimum and thereby render it freely rotatable.

12. In a machine tool, a base, a work supporting table supported by said base for rotational and axial movement relative thereto, a cylinder mounted on the underside of said work supporting table to move with it, a piston positioned within said cylinder and rigidly connected to said base, a source of fluid pressure, and a valve connected to receive fluid pressure from said source and to direct it to said cylinder either above or below the piston selectively, whereby application of fluid pressure into the cylinder below the pinion serves to draw the cylinder and its associated table downwardly to force the table into tight engagement with the base and thereby firmly clamp it in position and the application of fluid pressure into the cylinder above the piston serves to effect an upward pressure upon the cylinder and its associated table to raise the table from the base so that it is supported by the column of fluid pressure in the cylinder to reduce the frictional resistances to its rotation to a minimum and thereby render it freely rotatable.

13. In a machine tool, a base, a work supporting table supported by said base for rotational and axial movement relative thereto, a cylinder formed at the underside of said work supporting table and having a lower port and an upper port, a center post attached to said base to extend upwardly therefrom through said cylinder concentrically with said table to position the axis of the table relative to the base, a piston fixed to said center post within the cylinder between its upper and lower ports, a source of fluid pressure, and a valve connected to receive fluid pressure from said source and to direct it selectively to either the upper port or the lower port of said cylinder, whereby the application of fluid pressure into the lower port of the cylinder serves to draw the cylinder and its associated table downwardly into tight engagement with the base to clamp it in position, and the application of fluid pressure into the upper port of the cylinder serves to effect an upward pressure upon the cylinder and its associated table to raise the table from the base so that it is supported by the column of fluid pressure in the cylinder to reduce the frictional resistances to its rotation to a minimum and thereby render it freely rotatable.

14. In a machine tool, a base, a work supporting table supported by said base for rotational and axial movement relative thereto and having a plurality of slots associated therewith, a source of fluid pressure, a cylinder mounted on the underside of said work supporting table to move with it, a piston positioned within said cylinder and rigidly connected to said base, a second cylinder supported by said base and having a port at each end and a pair of intermediate ports disposed in spaced relationship between said end ports, a first conduit engaged to connect the first of said pair of intermediate ports to said first cylinder below its associated piston, a second conduit engaged to connect the second of said pair of intermediate ports to said first cylinder above its associated piston, a valve connected to receive fluid pressure from said source and direct it to either of said end ports selectively, an indexing piston disposed in said second cylinder for axial movement therein to be actuated in either direction by fluid pressure entering through said end ports, and a plunger secured to said indexing piston to move with it in position to individually engage the slots associated with said table for locating the table in the proper index position when the indexing piston is moved in one direction and to be withdrawn from the slot with which it is in engagement when the indexing piston is moved in the opposite direction, said indexing piston being arranged to close said first intermediate port until the piston is moved sufficiently in a direction to engage its associated plunger with a slot associated with the table to accurately locate the table and to open said first intermediate port after the table has been located by said plunger to place the first intermediate port in communication with the end port receiving fluid pressure for directing the fluid pressure through said first conduit into said first cylinder below its associated piston to draw the cylinder and its associated table downwardly to force the table into tight engagement with the base and thereby firmly clamp it in position, said index piston being also arranged to close said second intermediate port until the piston is moved sufficiently in a direction to withdraw its associated plunger from a slot associated with the table and to open said second intermediate port after its associated plunger has been withdrawn from a slot associated with the table to place the second intermediate port in communication with the end port receiving fluid pressure for directing the fluid pressure through said second conduit into said first cylinder above its associated piston to raise the table off of the base and support it on the column of fluid pressure in the cylinder to render it freely rotatable, whereby the table cannot be clamped in position until it has been accurately located by said plunger and the table cannot be unclamped until said plunger is withdrawn from engagement with the cooperating slots.

15. In a machine tool, a base, a work supporting table supported by said base for rotational and axial movement relative thereto and having a plurality of slots associated therewith, a source of fluid pressure, a cylinder mounted on the underside of said work supporting table to move it, a piston positioned within said cylinder and rigidly connected to said base, a valve connected to receive fluid from said source and to direct it to said cylinder, a plunger in said valve positionable therein to control the flow of fluid pressure therefrom to said cylinder to either above or below its associated piston selectively, to either raise the table from the base to render it freely rotatable or to draw it downwardly into tight engagement with the base to clamp it in position, and an indexing pin secured to said plunger to move with it in position to individually engage the slots associated with said table when said valve plunger is moved in one direction and to be withdrawn therefrom when said valve plunger is moved in the opposite direction, said plunger being arranged to control the flow of fluid pressure to said cylinder so that the pressure will be directed to the cylinder below its associated piston only after the indexing pin is in engagement with a cooperating slot to accurately locate the table, and the fluid pressure will be directed to the cylinder above its associated piston only after the indexing pin is moved out of engagement with a cooperating slot, whereby the table will not be clamped to the base until it is accurately located by the indexing pin and will not be released from clamping engagement with the base until after the indexing pin is withdrawn from engagement with one of said cooperating slots.

16. In a machine tool, a base, a work supporting table supported by said base for rotational and axial movement relative thereto and having a plurality of slots associated therewith, a source of fluid pressure, a cylinder mounted on the underside of said work supporting table to move with it and having an upper port and a lower port, a piston positioned within said cylinder between said upper port and said lower port and rigidly connected to said base, an indexing plunger slidably mounted on said base for movement into engagement with the slots associated with said table to accurately locate the table in a precise rotational position, and a valve connected to receive fluid from said source and direct it selectively to either the upper port or the lower port of said cylinder to either raise the table from the base to render it freely rotatable or to draw it downwardly into tight engagement with the base to clamp it in position, said valve also being connected to control the movement of said indexing plunger into and out of engagement with said slots so that the flow of fluid pressure will be directed to the lower port of said cylinder only after the indexing plunger is in engagement with a cooperating slot to accurately locate the table, and the flow of fluid pressure will be directed to the upper port of said cylinder only after the indexing plunger is moved out of engagement with a cooperating slot, whereby the table will not be clamped to the base until its rotational position is accurately located by the indexing plunger and will not be released from clamping engagement with the base until after the indexing pin is withdrawn from engagement with one of said table slots.

17. In a machine tool, a base, a work supporting table supported by said base for rotational and axial movement relative thereto and having a plurality of slots associated therewith, a cylinder formed at the underside of said work supporting table and having a lower port and an upper port, a center post attached to said base to extend upwardly therefrom through said cylinder concentrically with said table to position the axis of the table relative to the base, a piston fixed to said center post within the cylinder between its upper and lower ports, an indexing plunger slidably mounted on said base for movement into engagement with the slots associated with said table to accurately locate the rotational position of the table, a source of fluid pressure, and a valve connected to receive pressure from said source to actuate said indexing plunger into and out of engagement with said slots and to direct the flow of said fluid pressure to either upper port of the cylinder or to the lower port of the cylinder selectively, whereby the indexing plunger serves to locate the rotational position of the table and the application of fluid pressure into the lower port of the cylinder serves to draw the cylinder and its associated table downwardly into tight engagement with the base to clamp it in position, while the application of fluid pressure into the upper port of the cylinder serves to effect an upward pressure upon the cylinder and its associated table to raise the table from the base so that it is supported by the column of fluid pressure in the cylinder to reduce the frictional resistances to its rotation to a minimum and thereby render it freely rotatable.

18. In a machine tool, a base, member movably mounted on said base, a source of fluid pressure, a clamping mechanism operably connected to be actuated by fluid pressure from said source in one direction to effect tight engagement of said movable member with said base to securely clamp said movable member in position relative to said base, said clamping mechanism also being operably connected to be actuated in the opposite direction by fluid pressure from said source to raise said movable member off of said base, and means connected to said source of fluid pressure and to said clamping mechanism to direct the fluid pressure to said clamping mechanism to effect operation of said clamping mechanism in the direction to move said movable member into tight engagement with said base or to direct fluid pressure to said clamping mechanism to effect operation of said clamping mechanism in the oppoiste direction to cause said clamping mechanism to raise said movable member off of said base, the fluid directed to said clamping mechanism to actuate it for raising said movable member being admitted to an enclosure under pressure and confined therein in a location to positively support the movable member in the raised position thereby facilitating the movement of said movable member relative to said base.

References Cited in the file of this patent

UNITED STATES PATENTS

| | | |
|---|---|---|
| 1,746,886 | Chipperfield | Feb. 11, 1930 |
| 1,924,594 | Blood et al. | Aug. 29, 1933 |
| 1,968,990 | Carlson | Aug. 7, 1934 |
| 2,135,639 | Gorham | Nov. 8, 1938 |
| 2,138,522 | Groene et al. | Nov. 29, 1938 |
| 2,417,366 | Kylin et al. | Mar. 11, 1947 |
| 2,443,278 | Stratton | June 15, 1948 |
| 2,453,600 | Soden | Nov. 9, 1948 |
| 2,615,288 | Klay et al. | Oct. 28, 1952 |
| 2,645,981 | Hirvonen | July 21, 1953 |

FOREIGN PATENTS

| | | |
|---|---|---|
| 498,920 | Great Britain | Jan. 11, 1939 |